United States Patent
Kim et al.

(10) Patent No.: US 12,134,674 B2
(45) Date of Patent: Nov. 5, 2024

(54) TRANSITION METAL COMPOUND AND CATALYST COMPOSITION COMPRISING THE SAME

(71) Applicant: LG Chem, Ltd., Seoul (KR)

(72) Inventors: Byung Seok Kim, Daejeon (KR); Insun Lee, Daejeon (KR); Seok Hwan Kim, Daejeon (KR); Jung Won Lee, Daejeon (KR); Donghyeon Gwon, Daejeon (KR); Sangjin Jeon, Daejeon (KR); Seyoung Kim, Daejeon (KR); Heekwang Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 689 days.

(21) Appl. No.: 17/432,205

(22) PCT Filed: Mar. 4, 2020

(86) PCT No.: PCT/KR2020/003044
§ 371 (c)(1),
(2) Date: Aug. 19, 2021

(87) PCT Pub. No.: WO2020/184887
PCT Pub. Date: Sep. 17, 2020

(65) Prior Publication Data
US 2022/0185916 A1    Jun. 16, 2022

(30) Foreign Application Priority Data

Mar. 13, 2019    (KR) ........................ 10-2019-0028867

(51) Int. Cl.
| | | |
|---|---|---|
| C07F 17/00 | (2006.01) | |
| C08F 2/38 | (2006.01) | |
| C08F 4/659 | (2006.01) | |
| C08F 4/6592 | (2006.01) | |
| C08F 110/06 | (2006.01) | |

(52) U.S. Cl.
CPC ............ *C08F 4/65927* (2013.01); *C08F 2/38* (2013.01); *C08F 4/65912* (2013.01); *C08F 4/65916* (2013.01); *C08F 110/06* (2013.01)

(58) Field of Classification Search
CPC ..... C07F 17/00; C08F 4/65927; C08F 110/06
See application file for complete search history.

(56) References Cited

U.S. PATENT DOCUMENTS

| | | |
|---|---|---|
| 5,741,868 A | 4/1998 | Winter et al. |
| 6,355,747 B1 | 3/2002 | Rausch et al. |
| 2003/0166803 A1 | 9/2003 | Rieger |
| 2007/0155919 A1 | 7/2007 | Okumura et al. |
| 2013/0217845 A1 | 8/2013 | Castro et al. |
| 2014/0179872 A1 | 6/2014 | Fiscus et al. |
| 2014/0179884 A1 | 6/2014 | McCullough |
| 2016/0208028 A1 | 7/2016 | Choi et al. |
| 2017/0114168 A1 | 4/2017 | Alliger et al. |
| 2017/0218105 A1 | 8/2017 | Kim et al. |
| 2018/0194873 A1 | 7/2018 | Kwon et al. |
| 2018/0201630 A1 | 7/2018 | Yang et al. |
| 2018/0280952 A1 | 10/2018 | O'Hare et al. |
| 2019/0106516 A1 | 4/2019 | Park et al. |
| 2019/0270833 A1 | 9/2019 | Chae et al. |
| 2020/0010589 A1 | 1/2020 | Lee et al. |
| 2020/0199165 A1 | 6/2020 | Friederichs et al. |

FOREIGN PATENT DOCUMENTS

| | | |
|---|---|---|
| CN | 104822697 A | 8/2015 |
| CN | 108602908 A | 9/2018 |
| CN | 109071699 A | 12/2018 |
| EP | 1077215 A1 | 2/2001 |
| EP | 3936542 A1 | 1/2022 |
| JP | H07224079 A | 8/1995 |
| JP | 2007513906 A | 5/2007 |
| JP | 2015172037 A | 10/2015 |
| JP | 2016172714 A | 9/2016 |
| JP | 2016172827 A | 9/2016 |
| JP | 2017145303 A | 8/2017 |
| KR | 20150037652 A | 4/2015 |
| KR | 20160115704 A | 10/2016 |
| KR | 20170009596 A | 1/2017 |
| KR | 101811141 B1 | 12/2017 |
| KR | 20180087868 A | 8/2018 |
| KR | 101903245 B1 | 10/2018 |
| KR | 101903892 B1 | 11/2018 |

(Continued)

OTHER PUBLICATIONS

International Search Report for PCT/KR2020/003044 dated Jun. 17, 2020. 2 pgs.

(Continued)

*Primary Examiner* — Caixia Lu
(74) *Attorney, Agent, or Firm* — Lerner David LLP

(57) ABSTRACT

The present disclosure relates to a novel transition metal compound represented by the following Chemical Formula 1, which exhibits excellent catalytic activity for propylene polymerization, and is useful in the preparation of a polypropylene having a narrow molecular weight distribution and a high melting point, a catalyst composition including the same, and a method for preparing a polypropylene using the same,

[Chemical Formula 1]

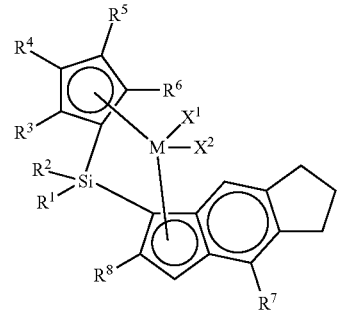

wherein M, $X^1$, $X^2$, and $R^1$ to $R^8$ are described herein.

16 Claims, No Drawings

(56) References Cited

FOREIGN PATENT DOCUMENTS

| KR | 20190019598 A | 2/2019 |
|----|---------------|--------|
| WO | 9952955 A1 | 10/1999 |
| WO | 2002046247 A2 | 6/2002 |
| WO | 2002055566 A2 | 7/2002 |
| WO | 2005058916 A2 | 6/2005 |
| WO | 2014099303 A1 | 6/2014 |
| WO | 2015065681 A1 | 5/2015 |
| WO | 2017026605 A1 | 2/2017 |
| WO | 2017060691 A1 | 4/2017 |
| WO | 2017069854 A1 | 4/2017 |
| WO | 2018097468 A1 | 5/2018 |
| WO | 2021034459 A1 | 2/2021 |

OTHER PUBLICATIONS

Extended Search Report for European Application No. 20770661.5 dated Jan. 31, 2022. 7 pgs.

TRANSITION METAL COMPOUND AND CATALYST COMPOSITION COMPRISING THE SAME

CROSS-REFERENCE TO RELATED APPLICATION(S)

The present application is a national stage entry under 35 U.S.C. § 371 of International Application No. PCT/KR2020/003044 filed on Mar. 4, 2020, which claims priority from Korean Patent Application No. 10-2019-0028867 filed on Mar. 13, 2019, the disclosures of which are incorporated herein by reference.

TECHNICAL FIELD

The present disclosure relates to a novel transition metal compound, a catalyst composition, and a method for preparing a polypropylene using the same.

BACKGROUND

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites exist together, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-active site catalyst which is a homogeneous complex catalyst, and offers a polymer having a narrow molecular weight distribution and a uniform compositional distribution of comonomers, due to the single-active site characteristics. The stereoregularity, copolymerization characteristics, molecular weight, crystallinity, etc. of the resulting polymer may be controlled by changing a ligand structure of the catalyst and polymerization conditions.

Recently, due to changes in environmental awareness, it has been attempted to reduce the generation of volatile organic compounds (VOCs) in many products. However, the Ziegler-Natta catalyst (Z/N), which is mainly used in the preparation of a polypropylene, has a problem of generating many VOCs, namely, high TVOC (total VOC). In particular, various commercially available polypropylene products are mainly prepared using the Ziegler-Natta catalyst, but recently, a conversion to products prepared using the metallocene catalyst having low odor and low elution characteristics has been accelerated.

However, when the polymerization of propylene is carried out using the generally known metallocene catalyst, it is not easy to control the amount of hydrogen gas during the polymerization since the basic molecular weight according to the catalyst is small. Further, the molecular weight distribution of the produced polypropylene becomes wide and a fiber breaking is often occurred during fiber production. In addition, the tacticity of the polypropylene becomes poor and the melting point (Tm) of the polypropylene is measured to be low, so that the thermal stability of the processed fiber is deteriorated.

Accordingly, there is a demand for developing a method for preparing a polypropylene having a high melting point with a narrow molecular weight distribution with high molecular weight using a metallocene-based catalyst.

DETAILED DESCRIPTION OF THE INVENTION

Technical Problem

In the present disclosure, there is provided a novel transition metal compound which exhibits high hydrogen reactivity with excellent catalytic activity for propylene polymerization, and is useful in the preparation of a polypropylene having a narrow molecular weight distribution and a high melting point, to improve thermal stability during fiber production, and to produce high-strength fibers.

There is also provided a catalyst composition including the transition metal compound.

Technical Solution

In the present disclosure, there is provided a transition metal compound represented by the following Chemical Formula 1.

[Chemical Formula 1]

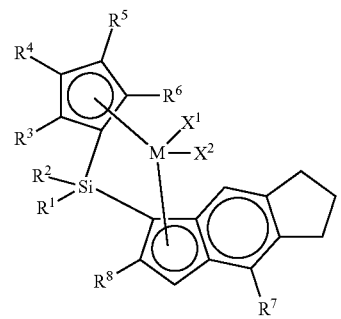

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is a substituted or unsubstituted $C_{6-20}$ aryl, and $R^8$ is $C_{1-20}$ alkyl.

In Chemical Formula 1, M may preferably be zirconium (Zr) or hafnium (Hf).

In Chemical Formula 1, each of the $R^1$ and $R^2$ may be $C_{1-8}$ linear or branched alkyl, or $C_{2-12}$ linear or branched alkoxyalkyl. Specifically, it may be methyl, ethyl, propyl, isopropyl, butyl, isobutyl, t-butyl, hexyl, or t-butoxyhexyl.

In Chemical Formula 1, each of the $R^3$ to $R^6$ may be $C_{1-6}$ linear or branched alkyl, or $C_{1-3}$ linear or branched alkyl. Specifically, it may be methyl, ethyl, propyl, or isopropyl, and methyl is preferable.

In Chemical Formula 1, $R^7$ may be phenyl, phenyl substituted with $C_{1-6}$ linear or branched alkyl, naphthyl, or naphthyl substituted with $C_{1-6}$ linear or branched alkyl.

Specifically, the phenyl or naphthyl may be each substituted with at least one or two of $C_{1-6}$ linear or branched alkyl. For example, the phenyl or naphthyl may be each substituted with at least one or two of methyl, ethyl, propyl, isopropyl, butyl, isobutyl, or t-butyl.

In Chemical Formula 1, $R^8$ may be $C_{1-6}$ linear or branched alkyl, or $C_{1-3}$ linear or branched alkyl. Specifically, it may be methyl, ethyl, or propyl, and methyl is preferable.

In addition, the compound represented by the Chemical Formula 1 may be, for example, represented by the following Chemical Formula 1-1.

[Chemical Formula 1-1]

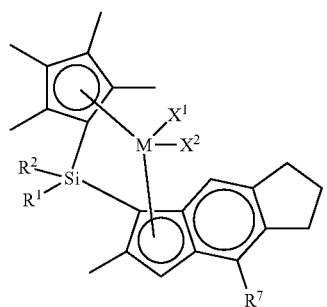

in Chemical Formula 1-1, M, $X^1$, $X^2$, $R^1$, $R^2$, and $R^7$ are as defined in Chemical Formula 1.

In addition, the compound represented by the Chemical Formula 1 may be, for example, any one of compounds represented by the following structural formulae. The following structural formula are shown by way of examples and will be described in detail. However, it is not intended to limit the present invention to the particular form disclosed.

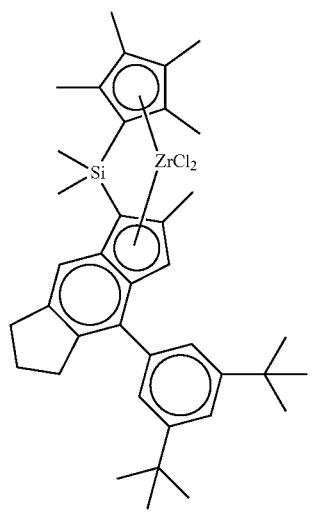

-continued

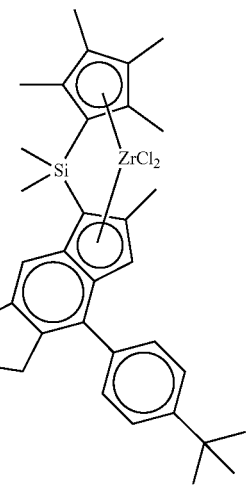

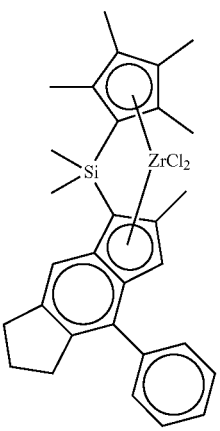

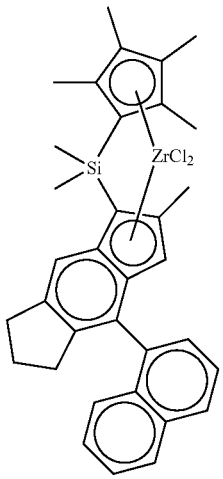

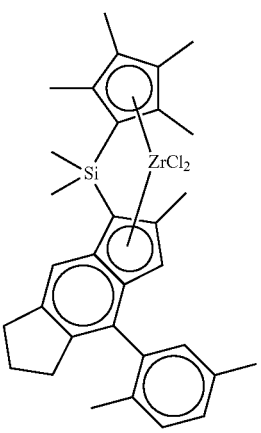

-continued
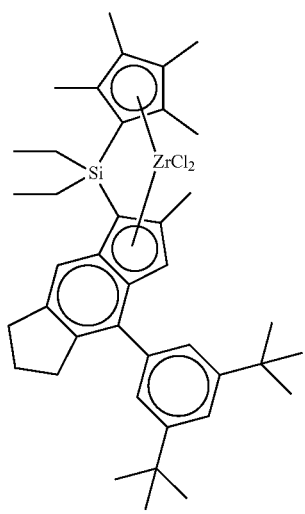
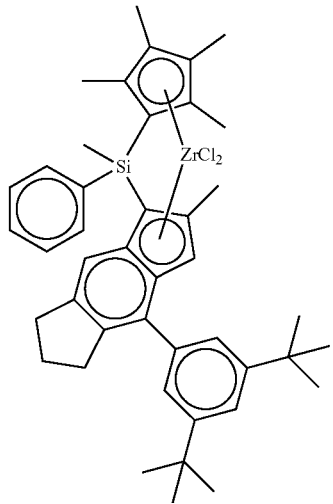
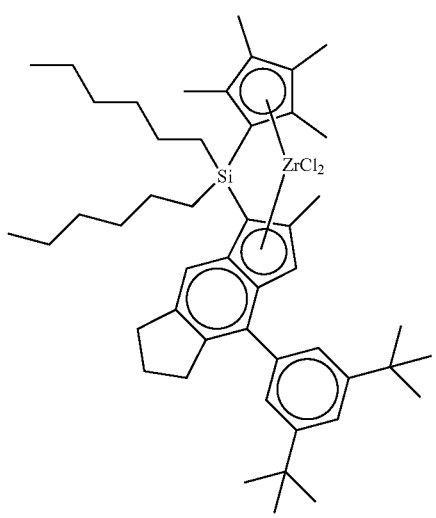
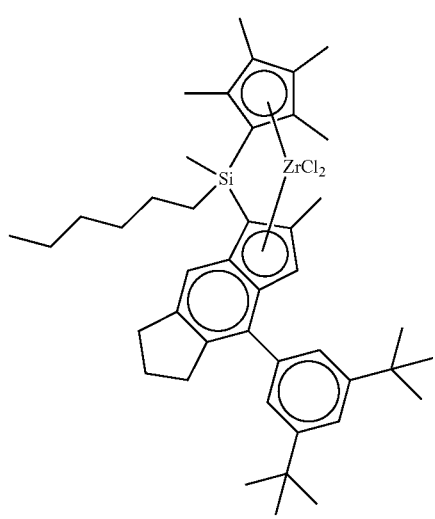
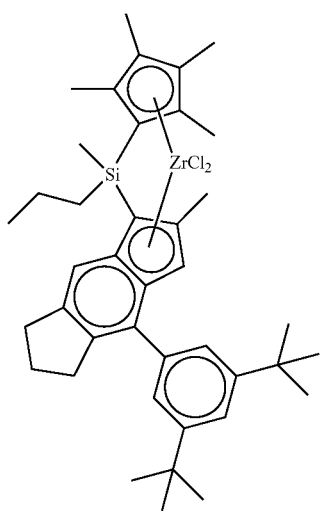
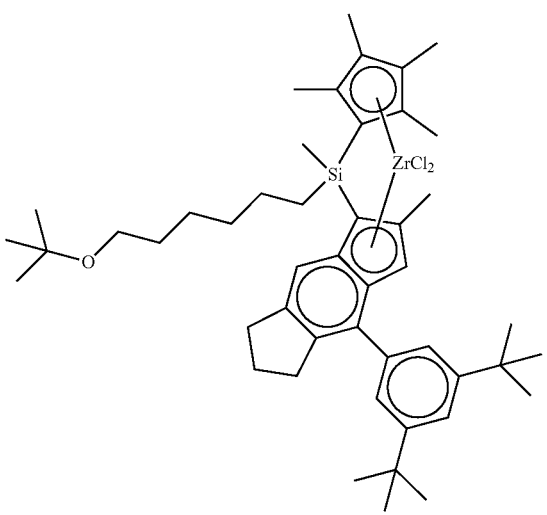

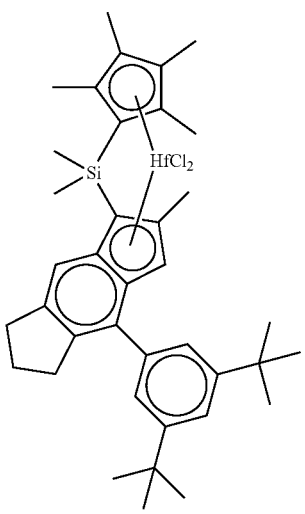
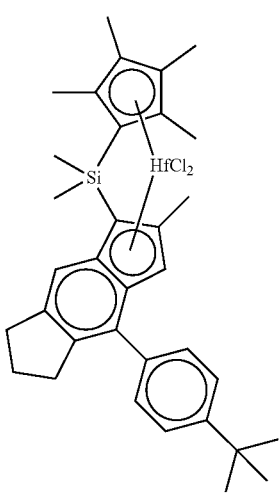
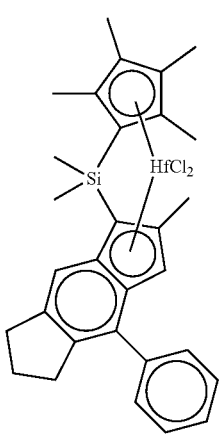
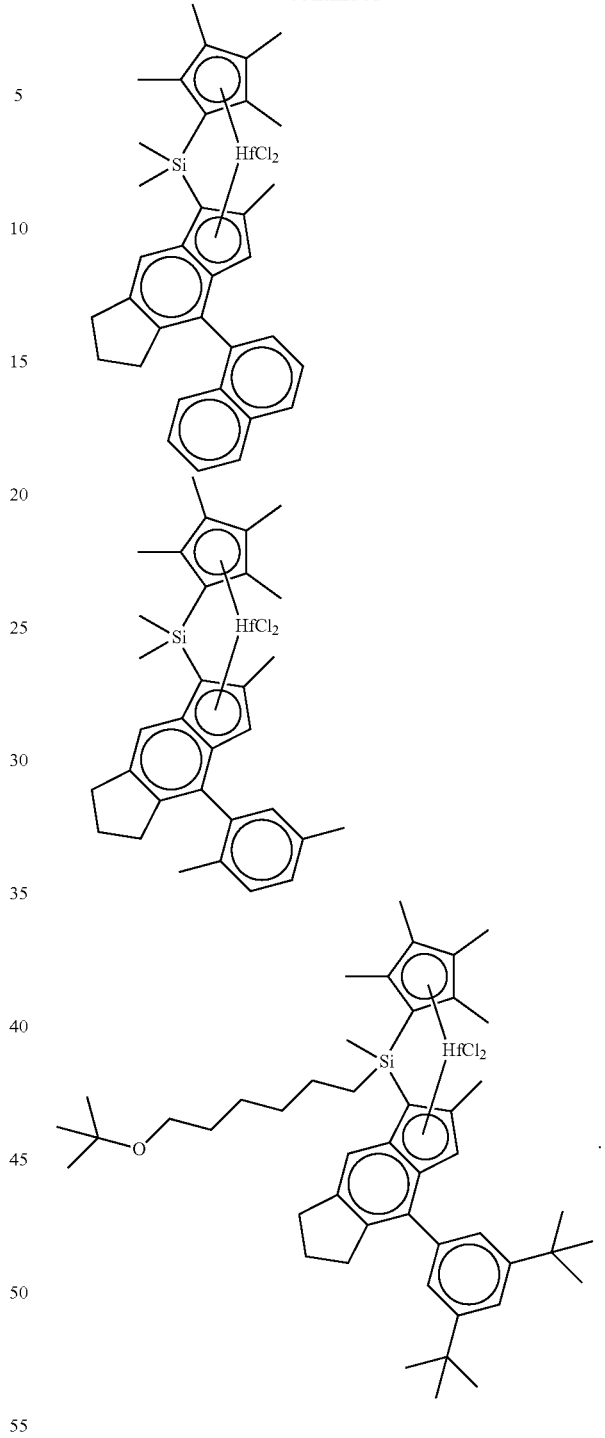

In the present disclosure, there is provided a catalyst composition including the above-described transition metal compound.

At this time, the catalyst composition may include the above transition metal compound and a support, and may be in a form in which the transition metal compound is supported on the support.

Further, the catalyst composition may further include at least one cocatalyst selected from the group consisting of compounds represented by the following Chemical Formulae 2 to 4.

—[Al(R$^{21}$)—O]$_m$—         [Chemical Formula 2]

in Chemical Formula 2, $R^{21}$ are the same as or different from each other, and are each independently halogen, $C_{1-20}$ alkyl, or $C_{1-20}$ haloalkyl; and m is an integer of 2 or more;

$$J(R^{31})_3 \qquad \text{[Chemical Formula 3]}$$

in Chemical Formula 3, $R^{31}$ are the same as or different from each other, and are each independently halogen, $C_{1-20}$ alkyl, or $C_{1-20}$ haloalkyl; and J is aluminum or boron;

$$[E-H]^+[ZQ_4]^- \qquad \text{[Chemical Formula 4]}$$

in Chemical Formula 4,

E is a neutral or cationic Lewis base;

H is a hydrogen atom;

Z is a group 13 element; and

Q are the same as or different from each other, and are each independently $C_{6-20}$ aryl or $C_{1-20}$ alkyl unsubstituted or substituted with at least one substituent selected from the group consisting of halogen, $C_{1-20}$ alkyl, $C_{1-20}$ alkoxy, and $C_{6-20}$ phenoxy.

In the present disclosure, there is provided a method for preparing a polypropylene, including a step of polymerizing propylene monomers in the presence of the above catalyst composition The polymerization step may be performed while introducing 750 ppm or less of hydrogen gas based on the propylene monomers.

At this time, the polypropylene to be prepared may be a homopolymer. In addition, the polypropylene may have a molecular weight distribution (Mw/Mn) of about 2.45 or less, or about 2.1 to about 2.45, a melt index ($MI_{2.16}$, measured at 230° C. under a load of 2.16 kg) of about 7.5 g/10 min to 45 g/10 min, and a melting point (Tm) of about 152.5° C. or more, or about 152.5° C. to about 160° C.

The terminology used herein is for the purpose of describing particular embodiments only and is not intended to be limiting of the invention.

The singular forms are intended to include the plural forms as well, unless the context clearly indicates otherwise.

It will be further understood that the terms "include", "have", or "possess" specify the presence of stated features, numbers, steps, components, or combinations thereof, but do not preclude the presence or addition of one or more other features, numbers, steps, components, or combinations thereof.

Also, as used herein, in case a layer or an element is mentioned to be formed "on" another layer or element, it means that the layer or element is directly formed on another layer or element, or it means that other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to an aspect of the present invention, there is provided a transition metal compound represented by the following Chemical Formula 1.

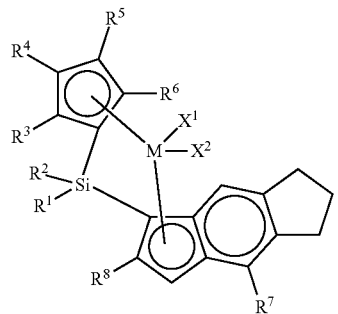

[Chemical Formula 1]

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is a substituted or unsubstituted $C_{6-20}$ aryl, and $R^8$ is $C_{1-20}$ alkyl.

Unless otherwise specified herein, following terms may be defined as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, or the like, but is not limited thereto.

The $C_{2-20}$ alkenyl may be linear, branched, or cyclic alkenyl. Specifically, it may be allyl, ethenyl, propenyl, butenyl, pentenyl, or the like, but is not limited thereto.

The $C_{1-20}$ alkoxy may be methoxy, ethoxy, isopropoxy, n-butoxy, tert-butoxy, pentoxy, cyclohexyloxy, or the like, but is not limited thereto.

The $C_{2-20}$ alkoxyalkyl group is a functional group in which at least one hydrogen of the above-mentioned alkyl is substituted with alkoxy, and it may be alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, and tert-butoxyhexyl; aryloxyalkyl such as phenoxyhexyl; or the like, but is not limited thereto.

The $C_{1-20}$ alkylsilyl or the $C_{1-20}$ alkoxysilyl is a functional group in which 1 to 3 hydrogens of —$SiH_3$ are substituted with 1 to 3 alkyl groups or alkoxy groups described above, and it may be alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; or the like, but is not limited thereto.

The $C_{1-20}$ silylalkyl is a functional group in which at least one hydrogen of the above-mentioned alkyl is substituted with silyl, and it may be —CH$_2$—SiH$_3$, methylsilylmethyl or dimethylethoxysilylpropyl, or the like, but is not limited thereto.

In addition, the C$_{1-20}$ alkylene is the same as the above-mentioned alkyl except that it is a divalent substituent, and it may be methylene, ethylene, propylene, butylene, pentylene, hexylene, heptylene, octylene, cyclopropylene, cyclobutylene, cyclopentylene, cyclohexylene, cycloheptylene, cyclooctylene, or the like, but is not limited thereto.

The C$_{6-20}$ aryl may be a monocyclic, bicyclic or tricyclic aromatic hydrocarbon. For example, the C$_{6-20}$ aryl may be phenyl, biphenyl, naphthyl, anthracenyl, phenanthrenyl, fluorenyl, or the like, but is not limited thereto.

The C$_{7-20}$ alkylaryl may refer to a substituent in which at least one hydrogen of the aromatic ring is substituted with the above-mentioned alkyl. For example, the C$_{7-20}$ alkylaryl may be methylphenyl, ethylphenyl, methylbiphenyl, methylnaphthyl, or the like, but is not limited thereto.

The C$_{7-20}$ arylalkyl may refer to a substituent in which at least one hydrogen of the alkyl is substituted with the above-mentioned aryl. For example, the C$_{7-20}$ arylalkyl may be phenylmethyl, phenylethyl, biphenylmethyl, naphthylmethyl, or the like, but is not limited thereto.

In addition, the C$_{6-20}$ arylene is the same as the above-mentioned aryl except that it is a divalent substituent, and it may be phenylene, biphenylene, naphthylene, anthracenylene, phenanthrenylene, fluorenylene, or the like, but is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

Meanwhile, the transition metal compound of the present disclosure has an asymmetric structure in which cyclopentadienyl-based groups different from each other are linked by a bridge as a ligand as shown in Chemical Formula 1 above.

Specifically, in Chemical Formula 1, a cyclopentadienyl group substituted with an alkyl group is linked to a bridge on the upper part of the ligand, and an indacenyl structure having a specific substituent is linked to the bridge on the lower part of the ligand.

According to the specific structure described above, the transition metal compound may have various characteristics of the two different cyclopentadienyl-based rings or may selectively take the advantages, thereby exhibiting better catalytic activity.

Specifically, as a hydrogen functional group is substituted with an alkyl group in the cyclopentadienyl structure, the cyclopentadienyl structure plays an important role in maintaining tacticity which is important for propylene polymerization. The maintenance of a steric spatial arrangement during preparing polypropylene induces—an isotactic polymer to grow with maintaining high activity. In the case of cyclopentadienyl (Cp) which is substituted only with hydrogen, there is no bulky portion. Thus, when the propylene is inserted, the catalyst faces in a completely open state, so that the tacticity collapses to form atactic PP.

In addition, when propylene (C3) and H$_2$ are reacted together, the reaction occurs competitively. When a structure is substituted at position 2 in the indacenyl structure of the ligand of Chemical Formula 1, for example, when R$^8$ is substituted with C$_{1-20}$ alkyl, a specific steric arrangement is given to the metal center, and thus, reactivity of H$_2$, which is smaller than C3, is improved. Accordingly, when a structure, in which R$^8$ is substituted with C$_{1-20}$ alkyl, such as methyl is substituted at position 2 in the indacenyl structure, hydrogen reactivity can be increased in the polymerization process.

In addition, an aryl substituent capable of giving electrons abundantly is substituted at position 4 in the indacenyl structure, and thus electrons are abundantly given to a metal atom included in the bridge structure of Chemical Formula 1, resulting in higher catalytic activity. Herein, an example of the aryl substituent may be a C$_{6-20}$ aryl substituent in which R$^7$ is a substituted or unsubstituted C$_{6-20}$ aryl.

In particular, the indacenyl ligand in the transition metal compounds according to the present disclosure can provide a very excellent effect for the active part in combination with cyclopentadienyl ligand, rather than the indenyl ligand. This is since, in the steric effect of cyclopentadienyl structures, it is possible to secure a flat structure that the indacenyl ligand faces to cyclopentadieny ligand, rather than the case of applying indenyl ligand with cyclopentadienyl ligand. Thus, the indacenyl structure seems to act very favorably on the activation of the propylene monomer by influencing the active site. This result can be confirmed by an increase in the tacticity of the polymerized polypropylene.

In addition, as the above-mentioned transition metal compound is in a form where two ligands are linked by a bridge group and provides electrons to the transition metal, it may have high structural stability and high polymerization activity even when supported on a support.

In Chemical Formula 1, M may preferably be zirconium (Zr) or hafnium (Hf).

In addition, in Chemical Formula 1, each of the R$^1$ and R$^2$ may be C$_{1-8}$ linear or branched alkyl, C$_{2-12}$ linear or branched alkoxyalkyl, or C$_{6-12}$ aryl. Specifically, it may be methyl, ethyl, propyl, isopropyl, butyl, isobutyl, tert-butyl, hexyl, tert-butoxyhexyl, or phenyl.

In addition, in Chemical Formula 1, each of the R$^3$ to R$^6$ may be C$_{1-6}$ linear or branched alkyl, or C$_{1-3}$ linear or branched alkyl. Specifically, it may be methyl, ethyl, propyl, or isopropyl, and methyl is preferable.

In addition, in Chemical Formula 1, R$^7$ may be phenyl, phenyl substituted with C$_{1-6}$ linear or branched alkyl, naphthyl, or naphthyl substituted with C$_{1-6}$ linear or branched alkyl. Specifically, the phenyl or naphthyl may be the one in which one or two or more of hydrogen are each substituted with C$_{1-6}$ linear or branched alkyl. For example, the phenyl or naphthyl of R$^7$ may be the one in which one or two or more of hydrogen are each substituted with methyl, ethyl, propyl, isopropyl, butyl, isobutyl, or tert-butyl.

The substituent at each position of the aromatic group can supply sufficient electrons to the aromatic group by an inductive effect, and increase the overall size of the transition metal compound. Moreover, an available angle may be increased and monomers may be easily accessed, thereby exhibiting better catalytic activity.

In Chemical Formula 1, $R^8$ may be $C_{1-6}$ linear or branched alkyl, or $C_{1-3}$ linear or branched alkyl. Specifically, it may be methyl, ethyl, or propyl, and methyl is preferable.

In addition, the compound represented by the Chemical Formula 1 may be, for example, represented by the following Chemical Formula 1-1.

[Chemical Formula 1-1]

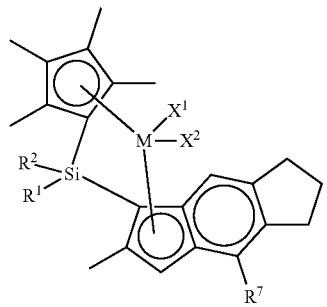

in Chemical Formula 1-1, M, $X^1$, $X^2$, $R^1$, $R^2$, and $R^7$ are as defined in Chemical Formula 1.

In addition, the compound represented by the Chemical Formula 1 may be, for example, any one of compounds represented by the following structural formulae.

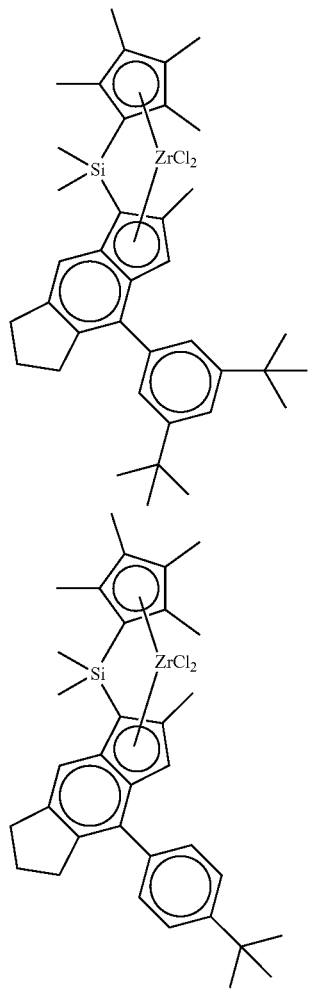

-continued

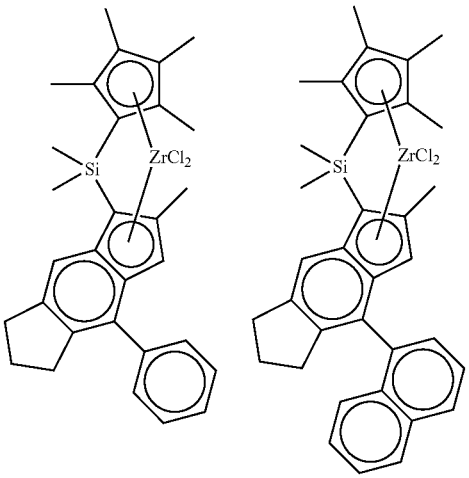

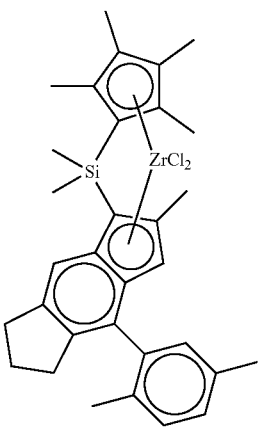

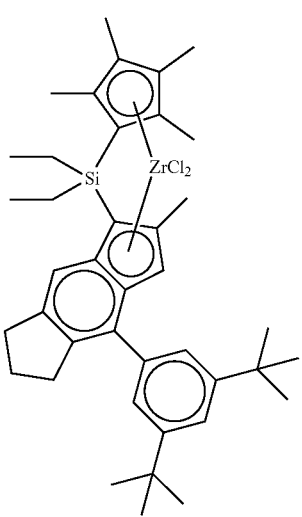

-continued
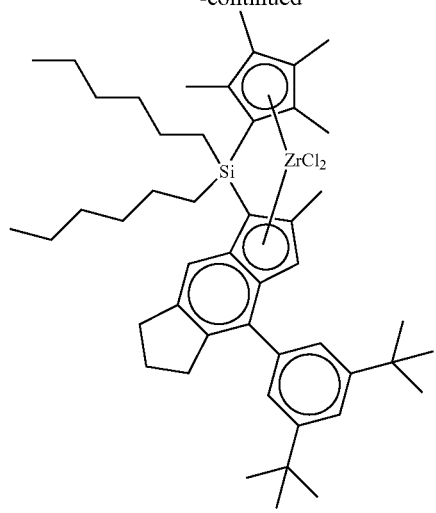
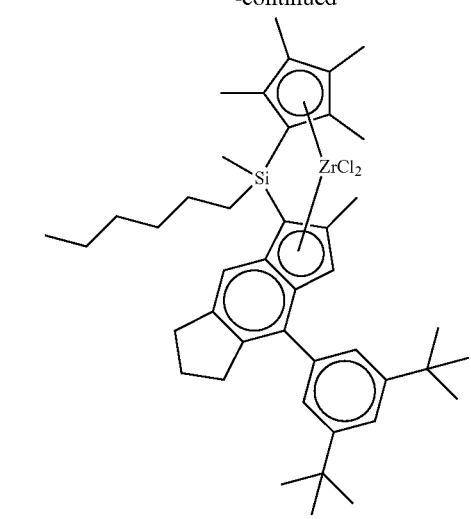
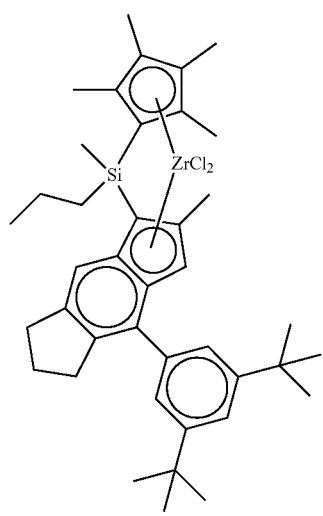
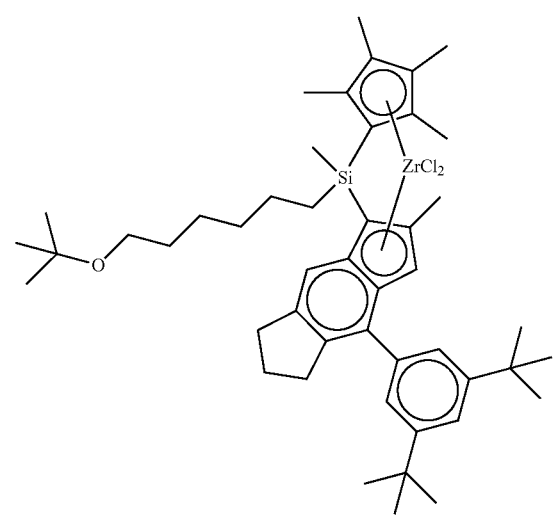
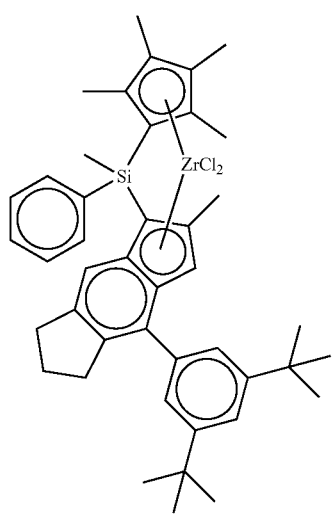
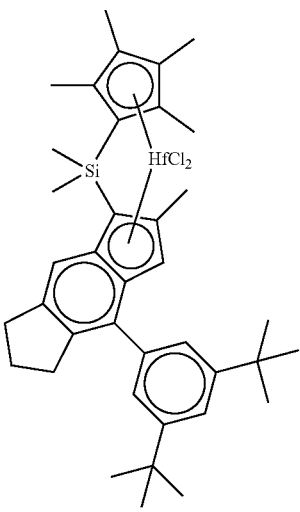

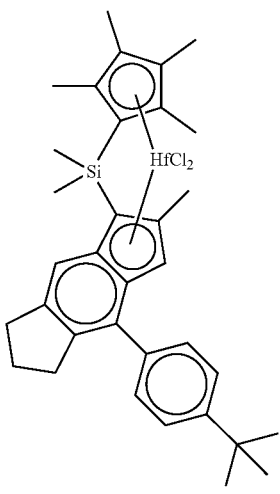

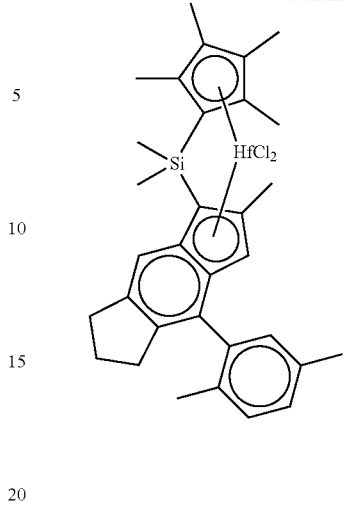

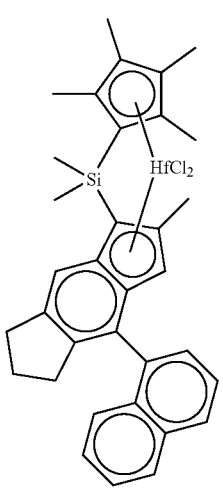

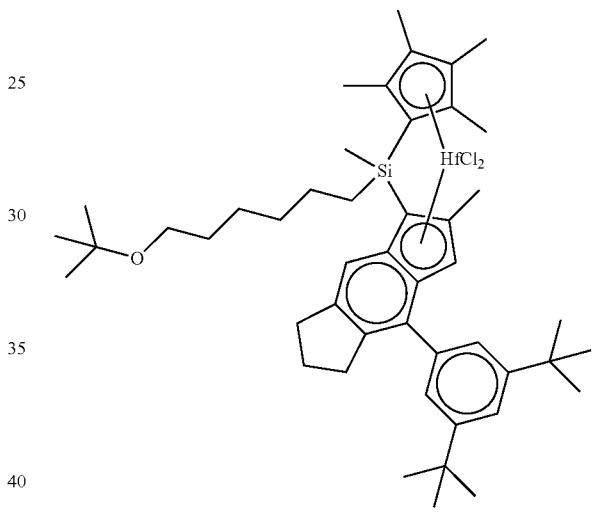

In addition, a series of reactions for preparing the ligand compound and the transition metal compound are as in Reaction Formula 1 below. However, the following Reaction Formula 1 is an example for illustrating the present disclosure, and the present disclosure is not limited thereto.

Referring to the following Reaction Formula 1, the transition metal compound of Chemical Formula 1 according to an embodiment of the present disclosure may be prepared by a method including the steps of: reacting a cyclopentadienyl compound (compound 1) in which $R^3$ to $R^6$ are substituted with a halogenated silane compound (Silane) in which $R^1$ and $R^2$ are substituted to prepare a cyclopentadienyl compound (compound 2) to which a silicon bridge group is linked (Step 1); reacting the cyclopentadienyl compound (compound 2) to which a silicon bridge group is linked with an indacene compound in which $R^7$, and $R^8$ are substituted to prepare a ligand compound (compound 3) in which cyclopentadienyl and indacenyl are linked by a silicone bridge group (Step 2); and reacting the ligand compound (compound 3) with a metal halide of a group 4 transition metal in which the group 4 transition metal M is substituted with halogen elements $X^1$ and $X^2$ to prepare a transition metal compound (compound 4) of Chemical Formula 1 (Step 3).

[Reaction Formula 1]

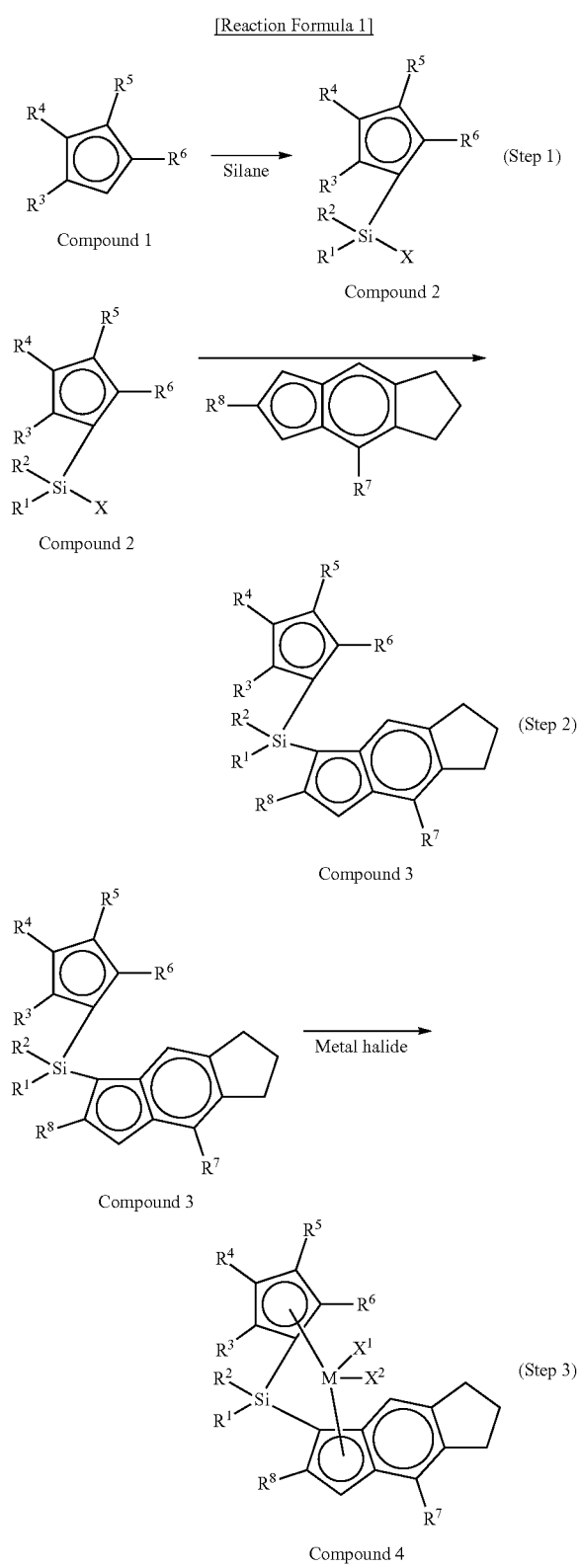

In the Reaction Formula 1, each substituent group is as defined above, and X is a halogen element. Each reaction of the above steps may be carried out by applying known reactions, and a more detailed synthesis method may be referred to the following Preparation Examples.

Specifically, the transition metal compound according to an embodiment of the present disclosure may be prepared by a method including the steps of: reacting a precursor compound (compound 1) such as tetramethylcyclopentadienyl with a compound providing a bridge group such as halogenated silane (Silane) in the presence of alkyl lithium such as butyl lithium (n-BuLi) to prepare a silicon bridge-linked cyclopentadienyl compound (compound 2) (Step 1); reacting the silicon bridge-linked cyclopentadienyl compound (compound 2) with an indene compound in which positions 2 and 4 are substituted with a specific substituent of $R^8$, and $R^7$, respectively, in the presence of alkyllithium such as butyl lithium (n-BuLi) and CuCN to prepare a ligand compound (compound 3) in which cyclopentadienyl and indenyl are linked by a silicon bridge group (Step 2); and reacting the ligand compound (compound 3) with a metal halide of a Group 4 transition metal such as ZrCl4 to prepare a transition metal compound (compound 4) of Chemical Formula 1 (Step 3).

In the method for preparing the transition metal compound of the present disclosure, the equivalent (eq) refers to a molar equivalent (eq/mol).

According to another embodiment of the present disclosure, there is provided a catalyst composition including the above-described transition metal compound.

Specifically, the catalyst composition according to an embodiment of the present disclosure includes the transition metal compound of Chemical Formula 1 as a single catalyst.

Herein, the above catalyst composition may include the transition metal compound as a single component or may be in a form of a supported catalyst including the transition metal compound and a support. When using a supported metallocene catalyst, the polypropylene prepared has excellent morphology and physical properties, and the catalyst may be suitably used for slurry polymerization, bulk polymerization, and gas phase polymerization.

Specifically, the support may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at a high temperature, silica-alumina, or silica-magnesia, and it may usually contain oxides, carbonates, sulfates, or nitrates such as $Na_2O$, $K_2CO_3$, $BaSO_4$, $Mg(NO_3)_2$, and the like.

The support is preferably calcined or dried at about 200° C. to about 600° C., more preferably about 250° C. to about 600° C. When the temperature is too low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is too high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

For example, the amount of hydroxyl groups on the surface may be 0.1 mmol/g to 10 mmol/g, or 0.5 mmol/g to 5 mmol/g. The amounts of hydroxy groups may be controlled by the preparation method, the preparation conditions, or the drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the propylene, because the compound of Chemical Formula 1 is chemically bonded to and supported on the silica support. As a result, when the polypropylene is prepared by slurry polymerization or gas phase polymerization, a fouling phenomenon, sticking to the wall surface of the reactor or with each other, may be minimized.

When supported on a support, the content of the compound of Chemical Formula 1 may be, for example, about 10 µmol or more, or about 30 µmol or more, and about 100 µmol or less, or about 80 µmol or less based on a weight of the support, for example, 1 g of silica. When supported within the above content range, the supported catalyst may exhibit appropriate activity, which is advantageous in terms of maintaining catalytic activity and economical efficiency.

In particular, when a supported catalyst is prepared using the transition metal compound according to the present disclosure, tacticity is improved during propylene polymerization compared to using a supported catalyst using a generally known indene derivatives, so that the melting point (Tm) of polypropylene rises and the activity rapidly increases. In addition, the molecular weight of a polypropylene is increased compared to those prepared using a known catalyst structure. Accordingly, the molecular weight range that can be adjusted by the input of hydrogen is increased, so that various product grades can be produced efficiently. Specifically, in the case of polypropylene produced using a Ziegler-Natta (Z/N) catalyst or a commonly known metallocene catalyst, the molecular weight distribution (MWD, Mw/Mn) is wide, so it is difficult to apply to fabric or fiber products. On the other hand, when polypropylene is prepared using the transition metal compound of the present invention as a catalyst, the melting point (Tm) of polypropylene rises due to high tacticity, and the basic molecular weight and activity are good. Thus, there is little variation according to the amount of hydrogen and fabric or fiber products, and a product with a narrow molecular weight distribution (MWD, Mw/Mn) can be obtained. This not only can significantly reduce the probability that fiber breaking occurs during fiber production, but also has the advantage of improving thermal stability during fiber production and producing high-strength fibers.

In addition, the above catalyst composition may further include a cocatalyst in addition to the transition metal compound and the support.

Specifically, the cocatalyst may include at least one compound represented by the following Chemical Formula 2.

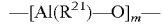 [Chemical Formula 2]

in Chemical Formula 2, $R^{21}$ are the same as or different from each other, and are each independently halogen, $C_{1-20}$ alkyl, or $C_{1-20}$ haloalkyl; and m is an integer of 2 or more.

Examples of the compound represented by Chemical Formula 2 may include an alkylaluminoxane-based compound such as methylaluminoxane, ethylaluminoxane, isobutylaluminoxane, butylaluminoxane, and the like, and any one or a mixture thereof may be used.

In addition, the cocatalyst may include at least one compound represented by the following Chemical Formula 3.

 [Chemical Formula 3]

in Chemical Formula 3, $R^{31}$ are the same as or different from each other, and are each independently halogen, $C_{1-20}$ alkyl, or $C_{1-20}$ haloalkyl; and J is aluminum or boron.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and a more preferred compound is selected from trimethylaluminum, triethylaluminum, and triisobutylaluminum.

In addition, the cocatalyst may include at least one compound represented by the following Chemical Formula 4.

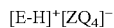 [Chemical Formula 4]

in Chemical Formula 4,

E is a neutral or cationic Lewis base;

H is a hydrogen atom;

Z is a group 13 element; and

Q are the same as or different from each other, and are each independently $C_{6-20}$ aryl or $C_{1-20}$ alkyl unsubstituted or substituted with at least one substituent selected from the group consisting of halogen, $C_{1-20}$ alkyl, $C_{1-20}$ alkoxy, and $C_{6-20}$ phenoxy.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o, p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o, p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

In order to exhibit better catalytic activity when used with the compound of Chemical Formula 1, the cocatalyst may preferably be the compound represented by the Chemical Formula 2. More specifically, the alkylaluminoxane-based compound such as methylaluminoxane may be further used as the cocatalyst. The alkylaluminoxane-based cocatalyst acts as a scavenger of a hydroxyl group present on the surface of the support to improve the catalytic activity and to convert the halogen group of the catalyst precursor to a methyl group, thereby promoting chain growth in the polymerization of a polypropylene.

The cocatalyst may be supported in an amount of about 3 mmol or more, or about 5 mmol or more, and about 20 mmol or less, or about 15 mmol or less based on a weight of the support, for example, 1 g of silica. When supported within the above content range, it is possible to obtain an effect of improving catalytic activity.

According to another embodiment of the present disclosure, there is provided a method for preparing a polypropylene, including a step of polymerizing propylene monomers in the presence of the above-described catalyst composition.

The polymerization reaction may be performed by homopolymerizing propylene using a continuous slurry polymerization reactor, a loop slurry reactor, a gas phase reactor, or a solution reactor.

In addition, the polymerization may be performed at a temperature of about 25° C. to about 500° C., preferably about 25° C. to about 200° C., more preferably about 50° C. to about 150° C. In addition, the polymerization may be performed at a pressure of about 1 kgf/cm$^2$ to about 100 kgf/cm$^2$, preferably about 1 kgf/cm$^2$ to about 50 kgf/cm$^2$, more preferably about 5 kgf/cm$^2$ to about 30 kgf/cm$^2$.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

In particular, the transition metal compound according to the present disclosure exhibits excellent catalytic activity when used as a polymerization catalyst for polypropylene production. For example, in the process of polymerizing the monomer in the presence of the catalyst composition comprising the transition metal compound, the catalytic activity value of the catalyst composition is about 9.5 kg/g_cat·h or more, or about 9.5 kg/g_cat·h to about 30 kg/g_cat·h, or about 10 kg/g_cat·h or more, or about 10 kg/g_cat·h to It may be about 30 kg/g_cat·h, or about 10.5 kg/g_cat·h or more, or about 10.5 kg/g_cat·h to about 30 kg/g_cat·h. Here, the catalytic activity value is calculated by the ratio of the weight (kg PP) of the polypropylene produced per weight (g) of the supported catalyst used based on the unit time (h). As an example, in the case of a resin composition for manufacturing multifilament fibers, a high catalytic activity of at least about 10.5 kg/g_cat·h may be obtained. Also, in the case of a resin composition for manufacturing spunbond fibers, a high of at least about 12 kg/g_cat·h or more catalytic activity can be obtained.

Such high catalytic activity can be obtained due to the indacenyl ligand of the transition metal compounds according to the present disclosure. In particular, the indacenyl ligand in the transition metal compounds according to the present disclosure can secure a flat structure that the indacenyl ligand faces to cyclopentadieny ligand in the steric effect of cyclopentadienyl structures. Thus, the indacenyl structure seems to act very favorably on the activation of the propylene monomer by influencing the active site.

In addition, when the transition metal compound according to the present disclosure is used as a polymerization catalyst for preparing a polypropylene, hydrogen reactivity is improved along with an excellent catalytic activity. The molecular weight of a polypropylene is increased compared to those prepared using a known catalyst structure. Accordingly, the molecular weight range that can be adjusted by the input of hydrogen is increased, so that various product grades can be produced efficiently. Also, a fabric or fiber product with a narrow molecular weight distribution (MWD, Mw/Mn) and high melting points can be obtained. This not only can significantly reduce the probability that fiber breaking occurs during fiber production, but also has the advantage of improving thermal stability during fiber production and producing high-strength fibers.

For example, the polymerization step may be performed while introducing about 750 ppm or less or about 0 ppm to about 750 ppm, about 730 ppm or less or about 100 ppm to about 730 ppm, or about 700 ppm or less or about 200 ppm to about 700 ppm of hydrogen gas based on the propylene monomers.

Specifically, when the polymerization process is performed using the transition metal compound of the present invention as a catalyst, various grades of products with different molecular weight and melt index ranges can be obtained depending on hydrogen reactivity, Then, the polymerization process may be performed by controlling the amount of hydrogen gas input, depending on the characteristics of the transition metal compound according to each of substituents. For example, the polymerization process may be performed by adding hydrogen gas in about 650 ppm or less or from about 0 to about 650 ppm, or about 600 ppm or less, or about 200 ppm to about 600 ppm can be added and carried out, based on the content of the propylene monomer, so as to obtain a resin composition having a melt index (MI$_{2.16}$) of about 7.5 g/10 min to about 20 g/10 min for manufacturing multifilament fibers. Meanwhile, when the amount of hydrogen gas input may be further increased more than the above ranges, for example, an increase of about 15 ppm or more, or from about 15 ppm to about 150 ppm, or about 20 ppm or more, or from about 20 ppm to about 100 ppm, a resin composition for manufacturing spunbond fibers having the melt index (MI$_{2.16}$) of about 20 g/10 min to about 45 g/10 min can be prepared. As an example, the polymerization process may be performed by adding hydrogen gas in about 750 ppm or less or from about 150 ppm to about 750 ppm, or about 700 ppm or less, or about 220 ppm to about 700 ppm, based on the content of the propylene monomer, so as to obtain a resin composition having a melt index (MI$_{2.16}$) of about 20 g/10 min to about 45 g/10 min for manufacturing spunbond fibers.

In addition, the polymerization step may be a homopolymerization reaction in which the propylene monomers are polymerized alone.

As described above, the polypropylene according to the present disclosure may be prepared by polymerizing propylene using the above-mentioned supported metallocene catalyst.

At this time, the polypropylene to be prepared may be a homopolymer.

In addition, the molecular weight distribution (Mw/Mn) of the polypropylene may be about 2.45 or less or about 2.1 to about 2.45, or about 2.42 or less or about 2.1 to about 2.42, or about 2.4 or less or about 2.1 to about 2.4.

For example, the molecular weight distribution (Mw/Mn) of the polypropylene can be determined by measuring a weight average molecular weight (Mw) and a number average molecular weight (Mn) using gel permeation chromatography (GPC, manufactured by Water), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polypropylene sample may be pretreated by dissolving in 1,2,4-trichlorobenzene containing 0.0125% of BHT at 160° C. for 10 hours using a GPC analyzer (PL-GP220), and the sample with a concentration of 10 mg/10 mL may be supplied in an amount of 200 μL. Mw and Mn may be obtained using a calibration curve formed using a polystyrene standard. 9 kinds of the polystyrene standard may be used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

For example, the weight average molecular weight (Mw) of the polypropylene may be about 150000 g/mol or more, or about 150000 g/mol to about 800000 g/mol, or about 180000 g/mol or more, or about 180000 g/mol to about 800000 g/mol. In particular, the weight average molecular weight (Mw) of the polypropylene may be about 220000 g/mol or more, or from about 220000 g/mol to about 800000 g/mol, or about 260000 g/mol or more, or from about 260000 g/mol to about 800000 g/mol, so as to obtain a resin composition for manufacturing multifilament fibers. Meanwhile, the weight average molecular weight (Mw) of the polypropylene may be about 150000 g/mol or more, or from about 150000 g/mol to about 400000 g/mol, or about 180000 g/mol or more, or from about 180000 g/mol to about 400000 g/mol, so as to obtain a resin composition for manufacturing spunbond fibers.

The polypropylene according to the present disclosure can secure a narrow molecular weight distribution with a high melting point by using a transition metal compound having a specific substituent and structure as described above. In particular, since the molecular weight of the polypropylene is relatively large, it is possible to produce products of various grades in a wide range of applications according to the reactivity with hydrogen gas. Also, the molecular weight distribution (MWD) of the polypropylene is narrow, so that the occurrence of a fiber breaking can be reduced remarkably in the high-speed spinning process for processing multiple strands of filaments into fibers by spinning them to a certain thickness and braiding them. In addition, the polypropylene can significantly reduce the occurrence of a fiber breaking, even when spinning as a spunbond used for manufacturing a multi-fill nonwoven fabric.

In addition, the polypropylene may have a melt index ($MI_{2.16}$) of about 7.5 g/10 min to about 15 g/10 min, or about 7.8 g/10 min to about 40 g/10 min, or about 8 g/10 min to about 35 g/10 min, when measured at 230° C. under a load of 2.16 kg according to the American Society for Testing and Materials ASTM D 1238. Specifically, the melt index ($MI_{2.16}$) of the polypropylene may be about 7.5 g/10 min to about 20 g/10 min, or about 7.8 g/10 min to about 18 g/10 min, or from about 8 g/10 min to about 15 g/10 min, so as to obtain a resin composition for manufacturing multifilament fibers. Meanwhile, the melt index ($MI_{2.16}$) of the polypropylene may be about 20 g/10 min to about 45 g/10 min, or about 23 g/10 min to about 40 g/10 min, or about 25 g/10 min to about 35 g/10 min, so as to obtain a resin composition for manufacturing spunbond fibers.

The melting point (Tm) of the polypropylene may be about 152.5° C. or more or about 152.5° C. to about 160° C., or about 153° C. or more or about 153° C. to about 158° C., or about 155° C. or more or about 155° C. to about 158° C.

For example, the melting point may be measured using differential scanning calorimeter (DSC 2920, manufactured by TA instrument). Specifically, the temperature of the polypropylene polymer is increased to 220° C., and maintained at that temperature for 5 minutes. After that, the temperature is lowered to 20° C., and further increased. The temperature at the top of the DSC (Differential Scanning calorimeter, manufactured by TA) curve is referred to as the melting point. Herein, the temperature is increased and lowered at a rate of 10° C./min, respectively, and the melting point is confirmed at the second heating period.

Meanwhile, the polypropylene according to the present disclosure can secure a narrow molecular weight distribution with a high melting point along with an excellent catalytic activity, by using a transition metal compound having a specific substituent and structure as described above. In particular, depending on the type of the substituents of the transition metal compound, the polypropylene may have a high melting point (Tm) of about 152.5° C. or more, or about 153° C. or more, or about 155° C. or more. Therefore, when manufacturing a fiber, there is an advantage of improving thermal stability of the fiber prepared using the polypropylene.

Advantageous Effects

When the transition metal compound according to the present disclosure is used as a polymerization catalyst for preparing a polypropylene, which have a narrow molecular weight distribution and a high melting point, along with excellent catalytic activity. Thereby, thermal stability can be improved in processing fibers such as multifilaments or spunbonds, which is advantageous for manufacturing high-strength fiber products.

DETAILED DESCRIPTION OF THE EMBODIMENTS

Hereinafter, the function and effect of the present invention will be described in more detail through specific Examples. However, these Examples are for illustrative purposes only, and the invention is not intended to be limited by these Examples.

EXAMPLES

Preparation of Transition Metal Compound

Example 1

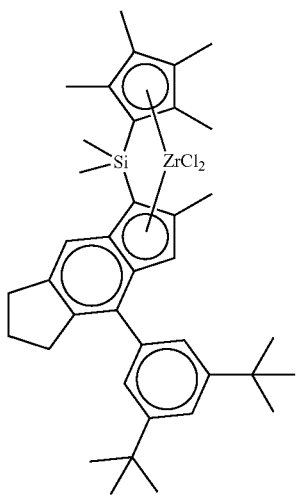

Preparation of Ligand Compound (2-methyl-4-(3',5'-ditertbutylphenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (Silane, 1.05 eq) was added thereto at −10° C., and stirred overnight at room temperature. In another reactor, 2-methyl-4-(3',5'-ditertbutylphenyl) indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

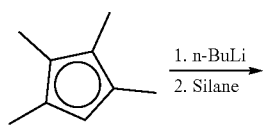

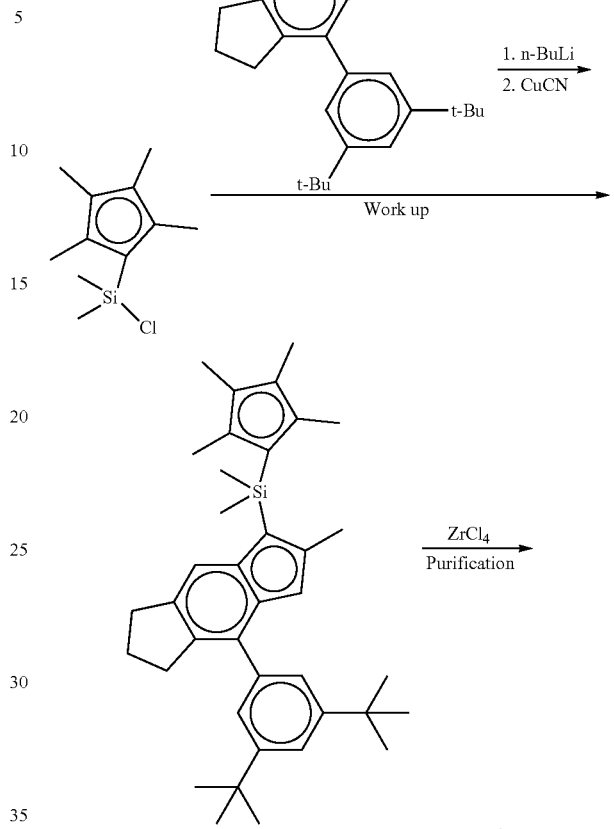

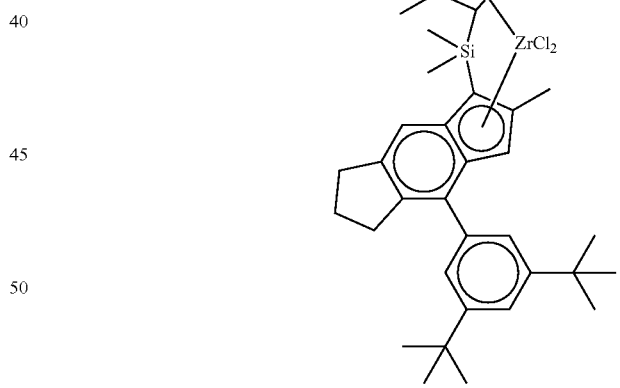

Preparation of Transition Metal Compound dimethylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/diethyether (toluene/Ether, 2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

For the transition metal compound prepared above, NMR data were measured with Bruker AVANCE III HD 500 MHz NMR/PABBO (1H/19F/Broad band) probe: 1H, and solvent: $CDCl_3$.

$^1$H-NMR (500 MHz, $CDCl_3$): 7.73 (s, 2H), 7.56 (s, 1H), 7.42 (s, 1H), 6.36 (s, 1H), 2.85-2.80 (m, 4H), 2.12 (s, 6H), 1.95 (m, 2H), 1.79 (s, 9H), 1.31 (s, 18H), 1.00 (s, 6H) ppm.

Example 2

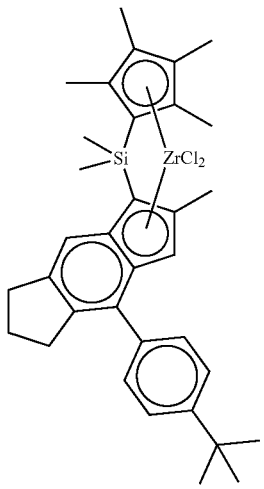

Preparation of Ligand Compound (2-methyl-4-(4'-(tert-butyl)-phenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-tetrabutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

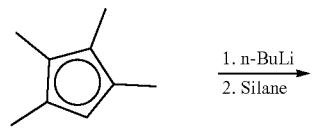

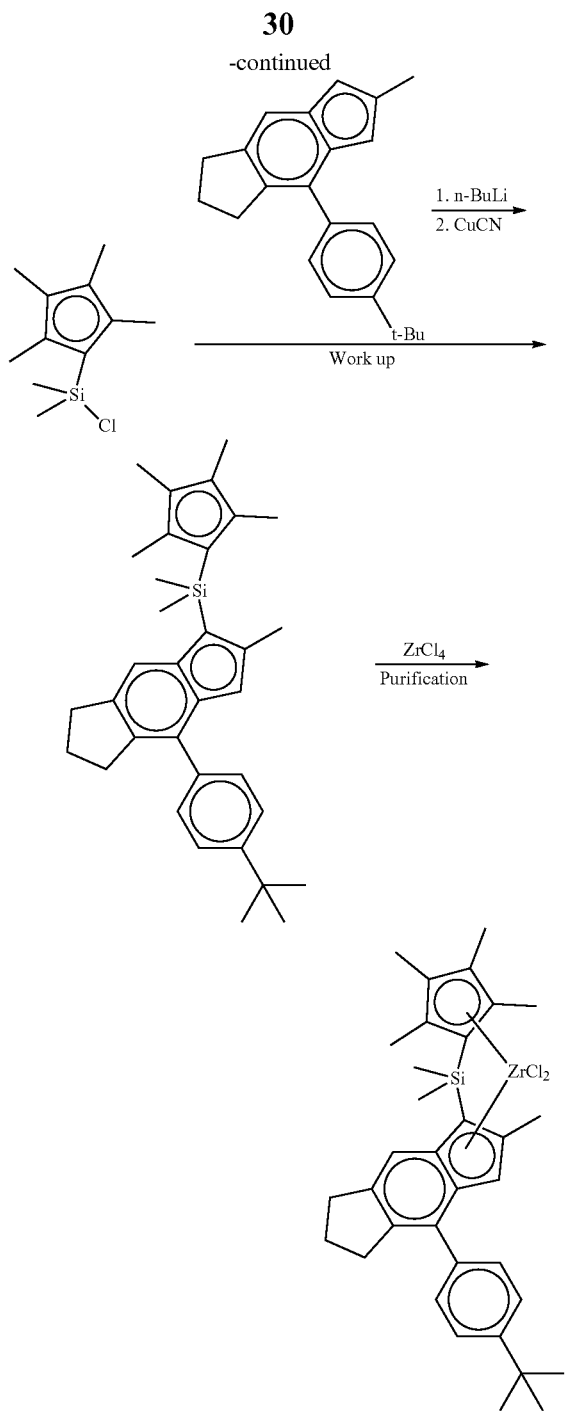

Preparation of Transition Metal Compound dimethylsilanediyl(2-methyl-4-(4'-(tert-butyl)-phenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^{1}$H-NMR (500 MHz, CDCl$_{3}$): 7.42 (s, 1H), 7.38 (d, 2H), 7.30 (d, 2H), 6.37 (s, 1H), 2.85-2.79 (m, 4H), 2.12 (s, 6H), 1.94 (m, 2H), 1.79 (s, 9H), 1.30 (s, 9H), 1.00 (s, 6H) ppm.

Example 3

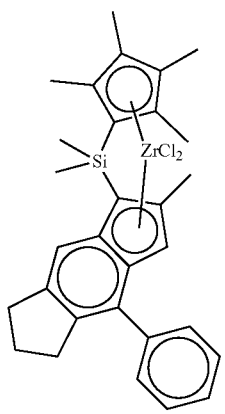

Preparation of Ligand Compound
(2-methyl-4-phenyl-indacenyl) dimethyl
(2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, (2-methyl-4-phenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

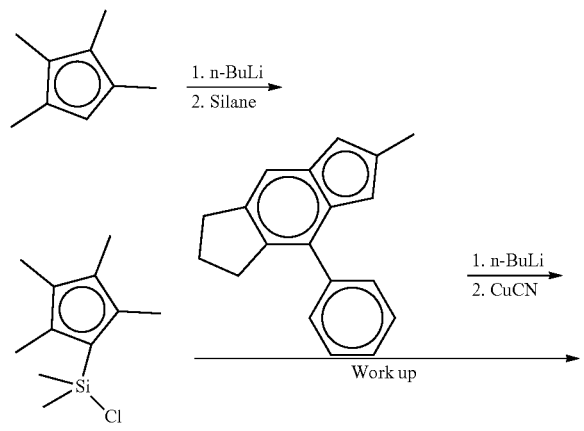

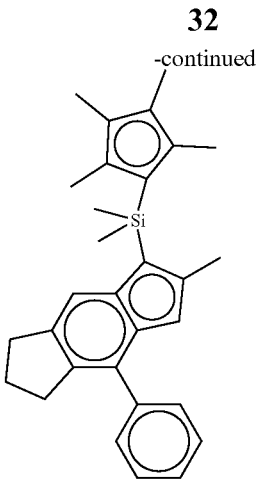

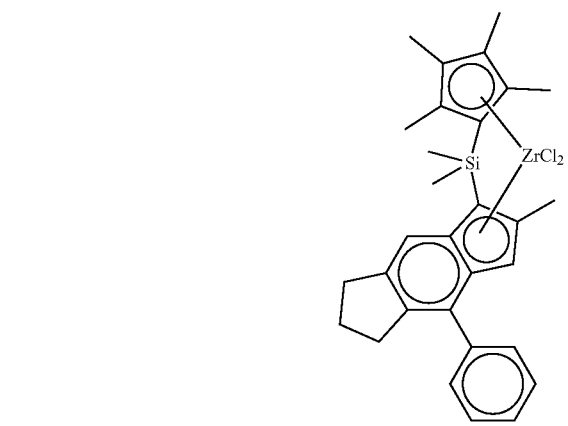

Preparation of Transition Metal Compound
dimethylsilanediyl(2-methyl-4-phenyl-indacenyl)
(2,3,4,5-tetramethyl cyclopentadienyl) zirconium
dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^{1}$H-NMR (500 MHz, CDCl$_{3}$): 7.54-7.38 (m, 6H), 6.37 (s, 1H), 2.85-2.80 (m, 4H), 2.12 (s, 6H), 1.95 (m, 2H), 1.79 (s, 9H), 0.99 (s, 6H) ppm.

Example 4

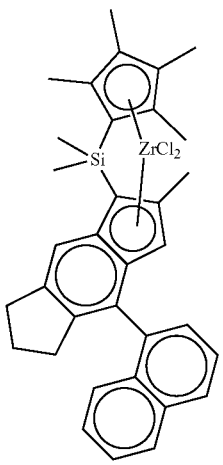

Preparation of Ligand Compound (2-methyl-4-(2'-naphthylene) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2'-naphthylene) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

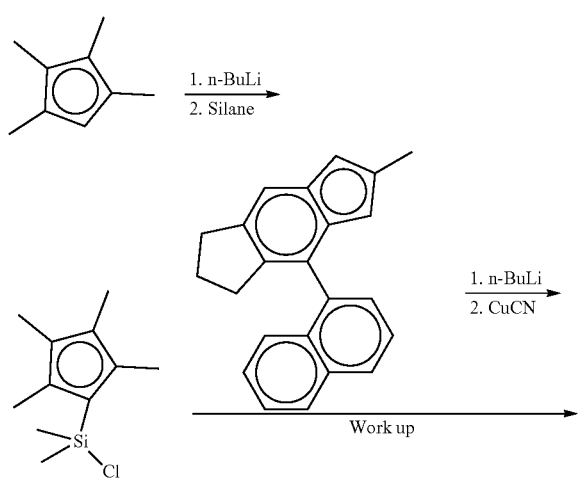

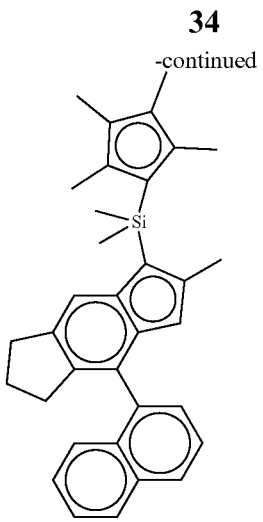

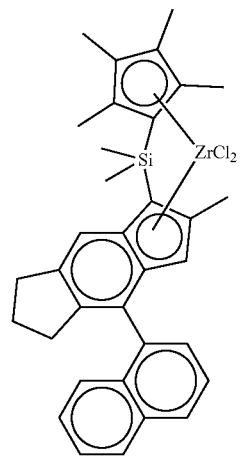

Preparation of Transition Metal Compound dimethylsilanediyl(2-methyl-4-(2'-naphthylene) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 8.80 (d, 1H), 8.50 (d, 1H), 8.2-8.05 (m, 2H), 7.75 (t, 1H), 7.55-7.36 (m, 3H), 6.36 (s, 1H), 2.85-2.81 (m, 4H), 2.13 (s, 6H), 1.95 (m, 2H), 1.8 (s, 6H), 1.78 (s, 3H), 1.01 (s, 6H) ppm.

Example 5

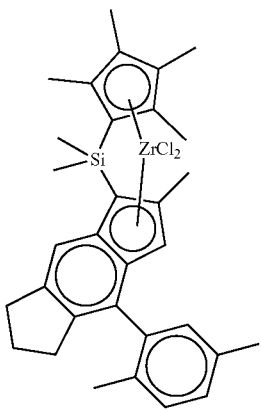

Preparation of Ligand Compound (2-methyl-4-(2', 5'-dimethylphenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2',5'-dimethylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

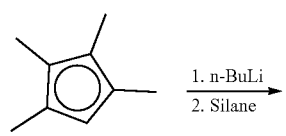

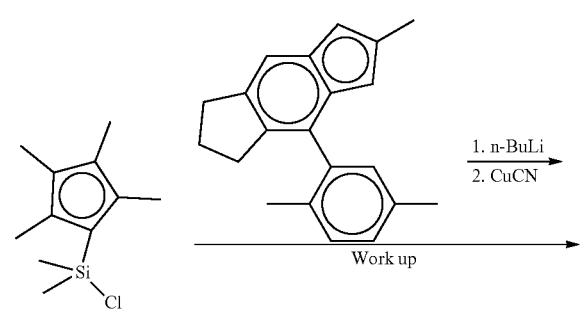

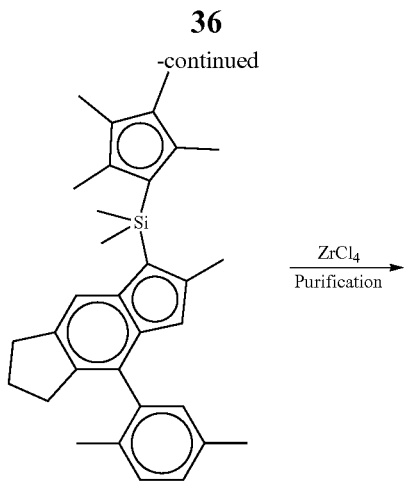

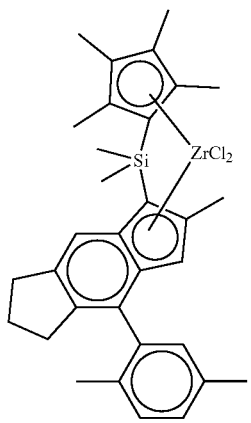

Preparation of Transition Metal Compound dimethylsilanediyl(2-methyl-4-(2',5'-dimethylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.73 (s, 1H), 7.50 (s, 1H), 7.28-7.20 (m, 2H), 6.36 (s, 1H), 2.85-2.80 (m, 4H), 2.45 (s, 3H), 2.28 (s, 3H), 2.12 (s, 6H), 1.95 (m, 2H), 1.8 (s, 6H), 1.79 (s, 3H), 0.99 (s, 6H) ppm.

Example 6

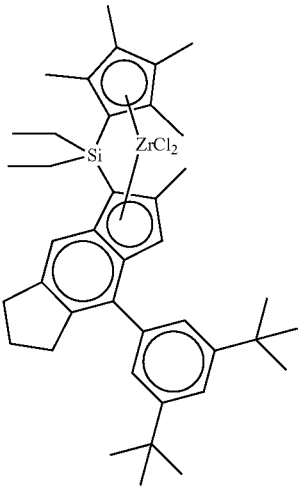

Preparation of Ligand Compound (2-methyl-4-(3', 5'-ditertbutylphenyl) indacenyl) diethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro diethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

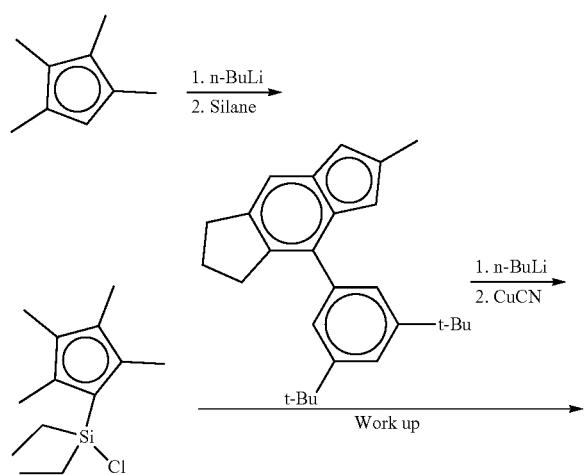

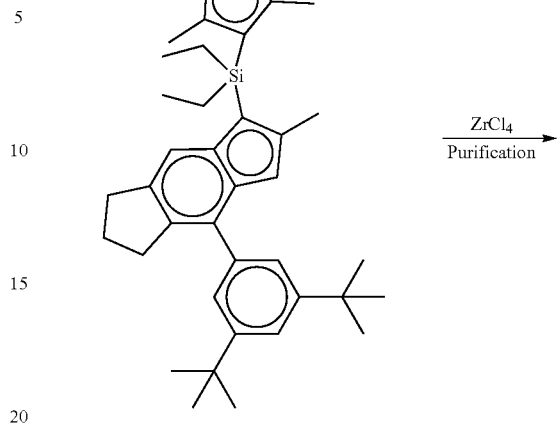

Preparation of Transition Metal Compound diethylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.73 (s, 2H), 7.55 (s, 1H), 7.41 (s, 1H), 6.38 (s, 1H), 2.86-2.80 (m, 4H), 2.12 (s, 6H), 1.95 (m, 2H), 1.79 (s, 9H), 1.28 (t, 6H), 0.94 (m, 4H) ppm.

Example 7

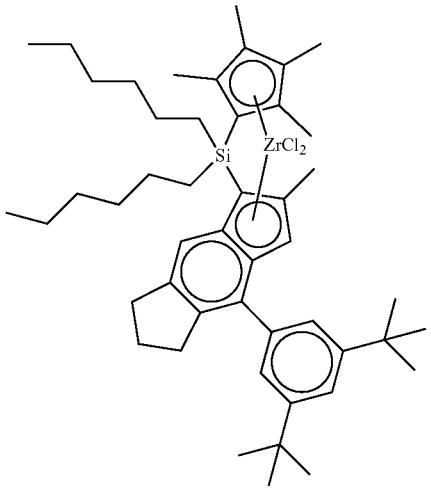

Preparation of Ligand Compound (2-methyl-4-(3', 5'-di(ter-tbutyl)phenyl) indacenyl) dihexyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dihexyl silane (1.05 eq) was added thereto at −10° C., and stirred overnight at room temperature. In another reactor, 2-methyl-4-(3',5'-ditert-butylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

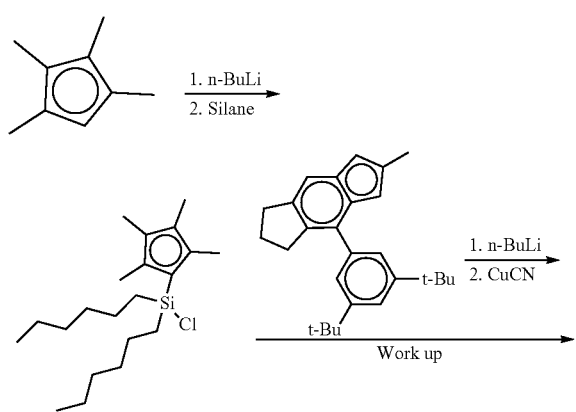

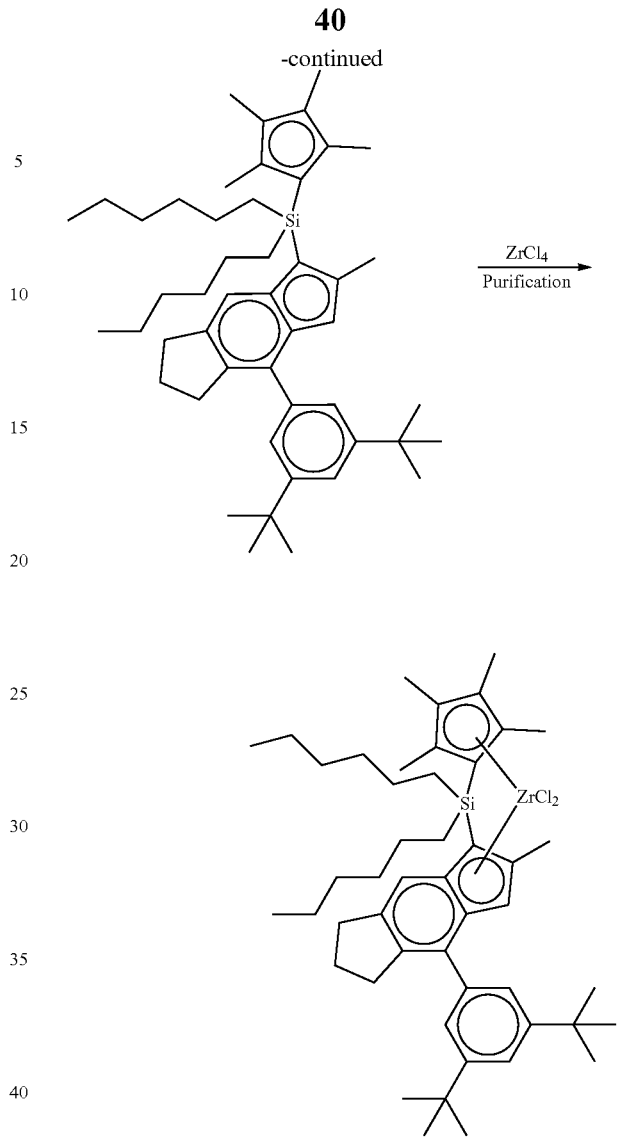

Preparation of Transition Metal Compound dihexylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.74 (s, 2H), 7.56 (s, 1H), 7.43 (s, 1H), 6.36 (s, 1H), 2.85-2.80 (m, 4H), 2.12 (s, 6H), 1.95 (m, 2H), 1.80 (s, 6H), 1.79 (s, 3H), 1.38-1.28 (m, 34H), 0.88 (t, 6H), 0.68 (m, 4H) ppm.

Example 8

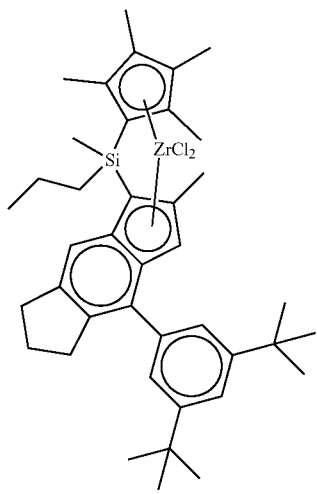

Preparation of Ligand Compound (2-methyl-4-(3', 5'-ditertbutylphenyl) indacenyl) methylpropyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro methylpropyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

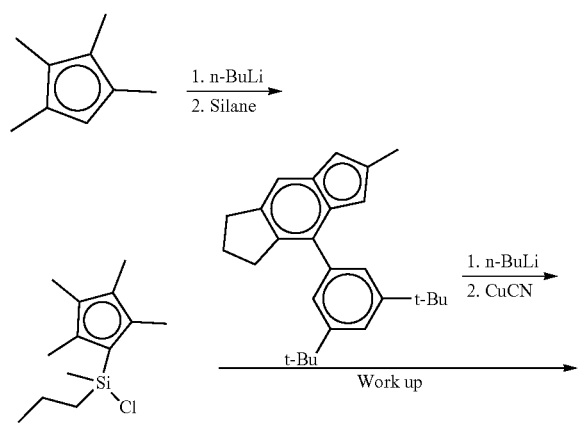

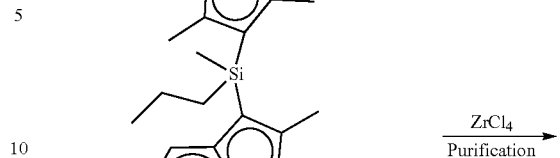

Preparation of Transition Metal Compound methylpropylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.73 (s, 2H), 7.55 (s, 1H), 7.42 (s, 1H), 6.36 (s, 1H), 2.85-2.80 (m, 4H), 2.13 (s, 6H), 1.95 (m, 2H), 1.79 (s, 9H), 1.31 (s, 18H), 1.00-0.84 (m, 10H) ppm.

Example 9

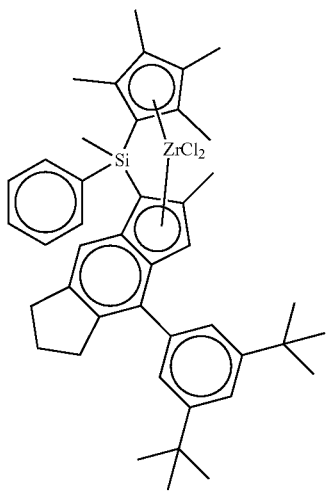

Preparation of Ligand Compound (2-methyl-4-(3', 5'-ditertbutylphenyl) indacenyl) methylphenyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro methylphenyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

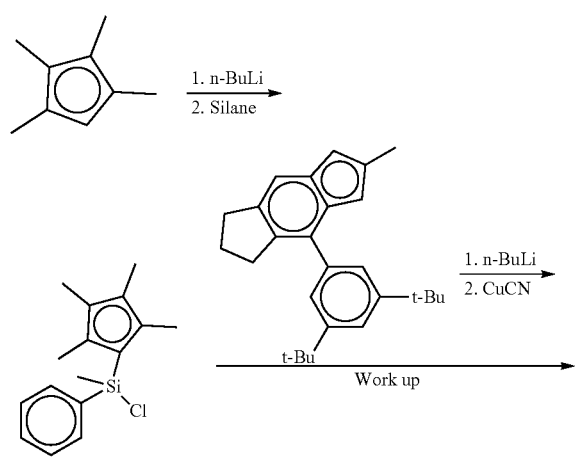

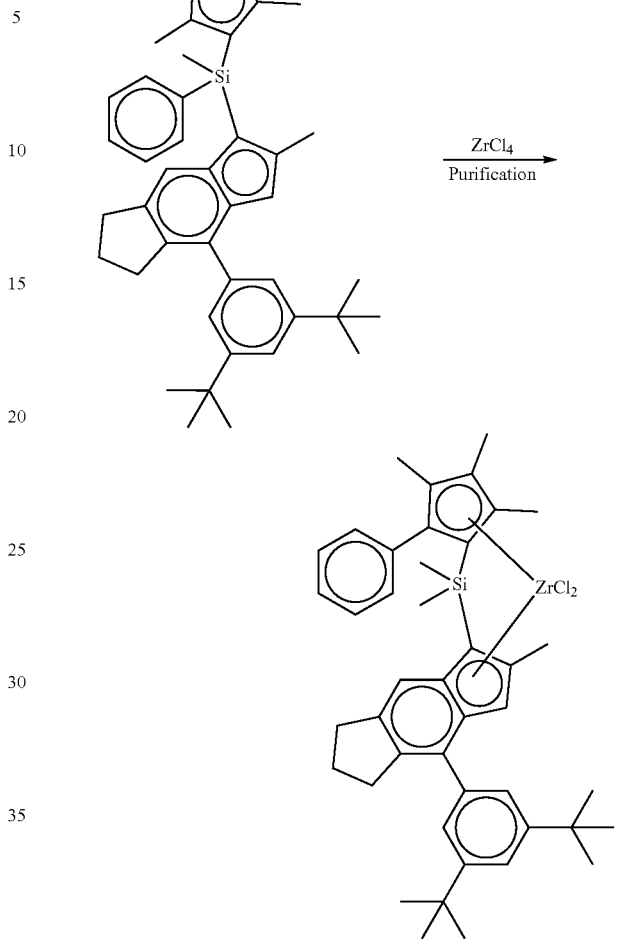

Preparation of Transition Metal Compound methylphenylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.73 (s, 2H), 7.56 (s, 1H), 7.42-7.28 (m, 6H), 6.38 (s, 1H), 2.88-2.82 (m, 4H), 2.12 (s, 6H), 1.95 (m, 2H), 1.79 (s, 9H), 1.31 (s, 18H), 0.98 (s, 3H) ppm.

Example 10

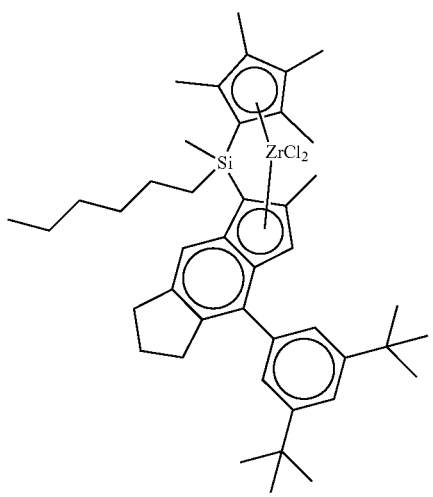

Preparation of Ligand Compound (2-methyl-4-(3', 5'-ditertbutylphenyl) indacenyl) methylhexyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro methylhexyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

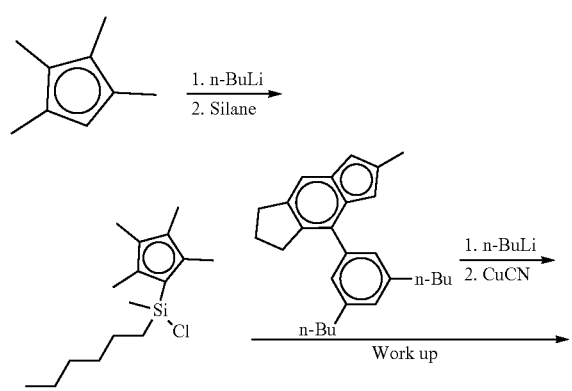

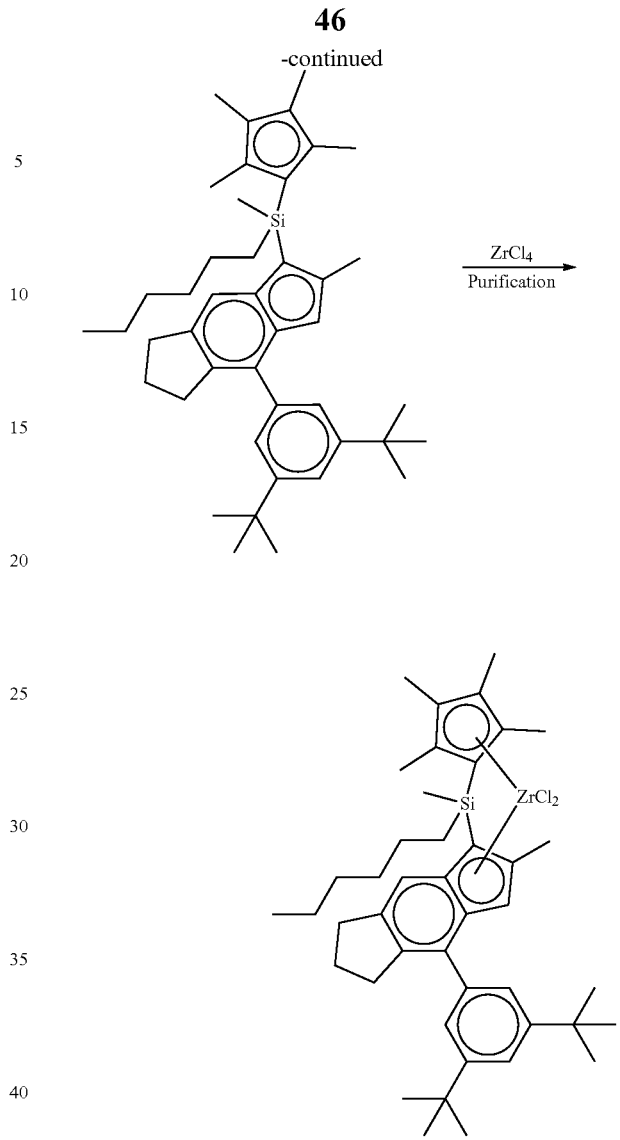

Preparation of Transition Metal Compound methylhexylsilanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.74 (s, 2H), 7.55 (s, 1H), 7.41 (s, 1H), 6.35 (s, 1H), 2.85-2.77 (m, 4H), 2.12 (s, 6H), 1.95 (m, 2H), 1.80 (s, 6H), 1.78 (s, 3H), 1.31 (s, 18H), 1.20-0.81 (m, 16H) ppm.

Example 11

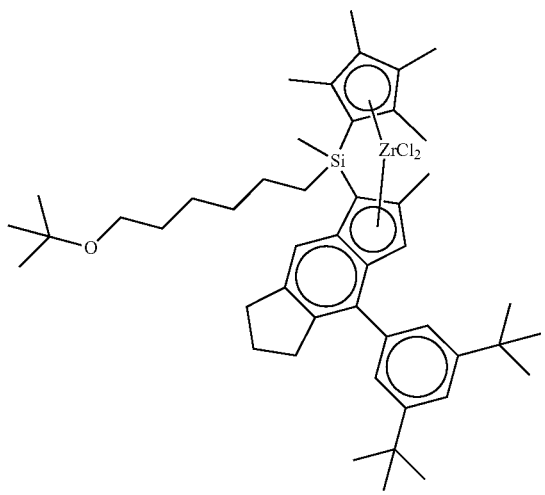

Preparation of Ligand Compound (2-methyl-4-(3', 5'-ditertbutylphenyl) indacenyl) 6-(tert-butoxy)-hexylmethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro 6-(tert-butoxy)-hexylmethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

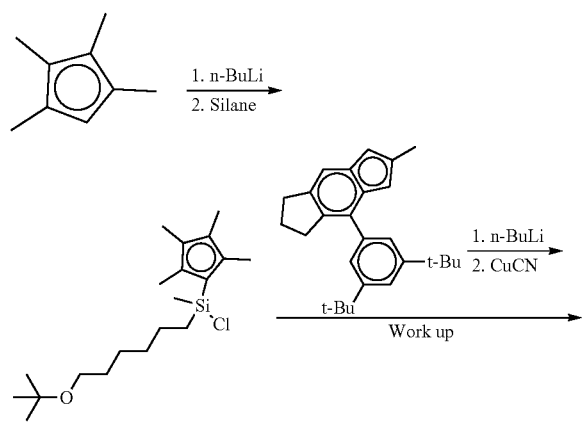

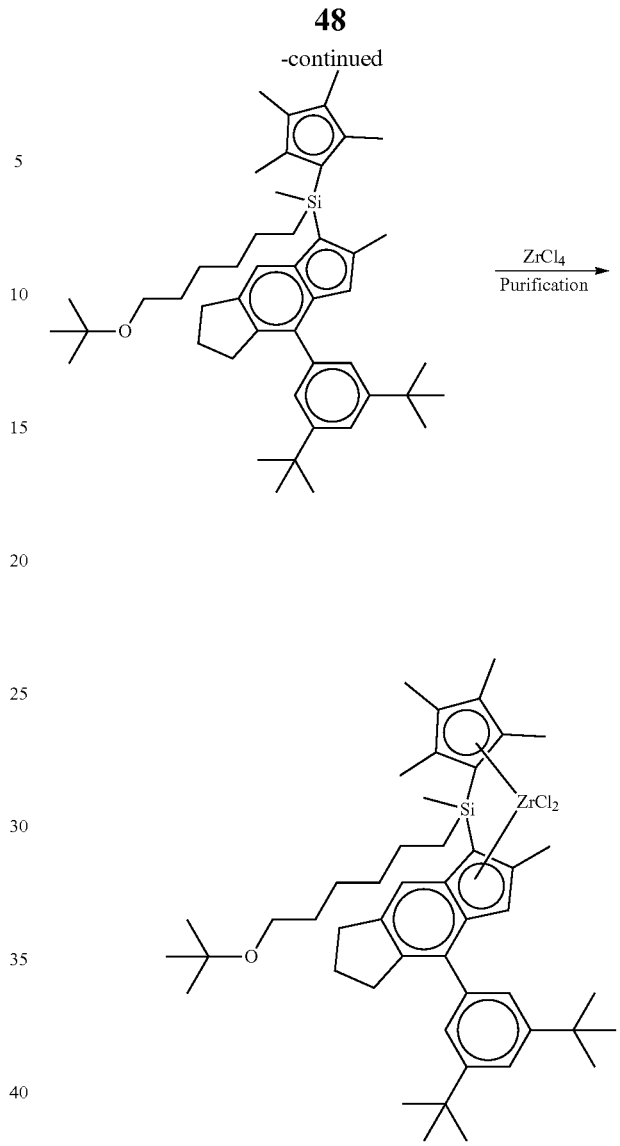

Preparation of Transition Metal Compound 6-(tert-butoxy)-hexylmethyl-silanediyl(2-methyl-4-(3',5'-ditertbutylphenyl) indacenyl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.74 (s, 2H), 7.57 (s, 1H), 7.44 (s, 1H), 6.36 (s, 1H), 3.25 (t, 2H), 2.85-2.80 (m, 4H), 2.12 (s, 6H), 1.95 (m, 2H), 1.80-1.48 (m, 13H), 1.33-1.21 (m, 22H), 1.1 (s, 9H), 0.91-0.84 (m, 5H) ppm.

Example 12

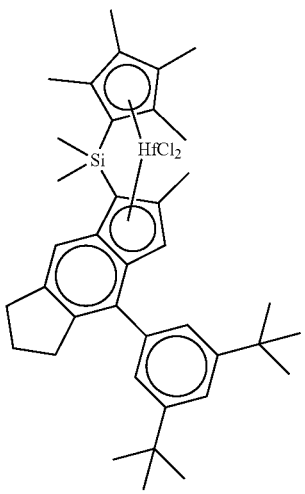

Preparation of Ligand Compound (2-methyl-4-(3',5'-ditertbutylphenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

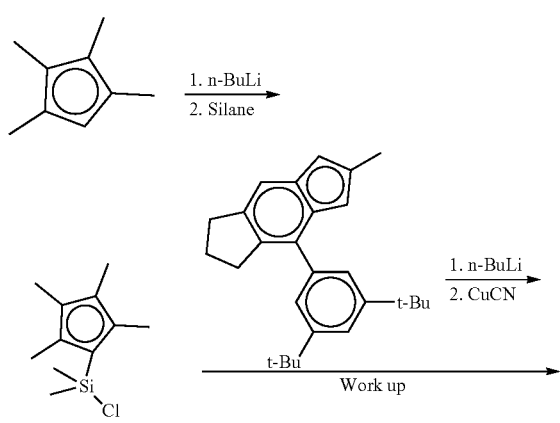

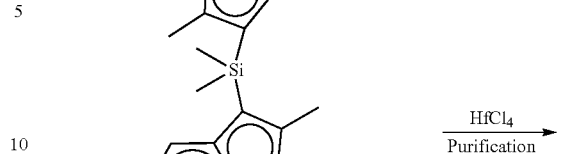

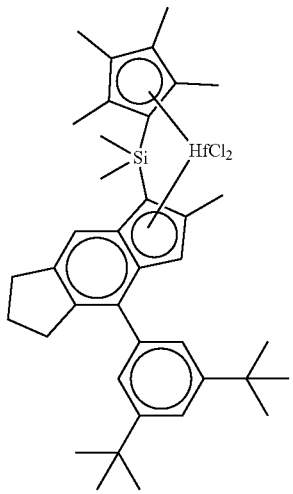

Preparation of Transition Metal Compound dimethylsilanediyl(2-methyl-4-(3',5'-ditertbutylphenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.78 (s, 2H), 7.6 (s, 1H), 7.46 (s, 1H), 6.41 (s, 1H), 2.98-2.92 (m, 4H), 2.14 (s, 6H), 1.98 (m, 2H), 1.83 (s, 6H), 1.8 (s, 3H), 1.33 (s, 18H), 1.28 (s, 6H) ppm.

Example 13

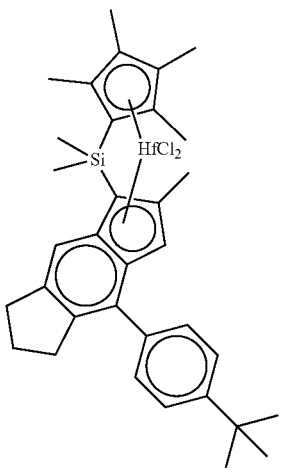

Preparation of Ligand Compound (2-methyl-4-(4'-(tert-butyl)-phenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

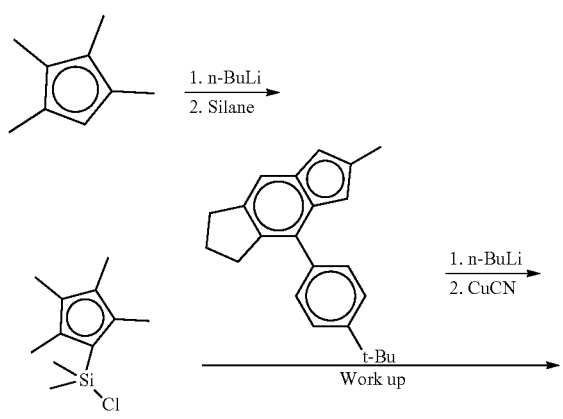

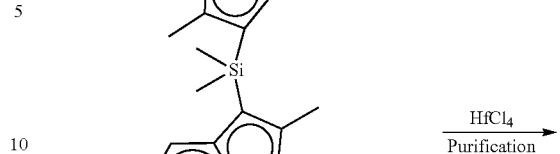

Preparation of Transition Metal Compound dimethylsilanediyl(2-methyl-4-(4'-(tert-butyl)-phenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl₃): 7.46 (s, 1H), 7.41 (d, 2H), 7.33 (d, 2H), 6.41 (s, 1H), 2.9-2.82 (m, 4H), 2.18 (s, 6H), 1.99 (m, 2H), 1.83 (s, 6H), 1.81 (s, 3H), 1.33 (s, 9H), 1.26 (s, 6H) ppm.

Example 14

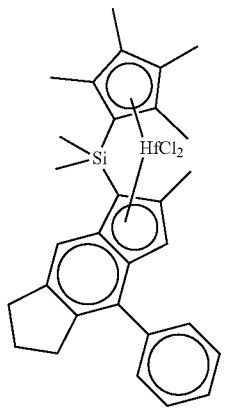

Preparation of Ligand Compound (2-methyl-4-phenyl-indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-phenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

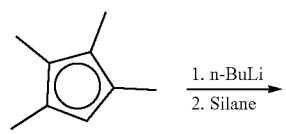

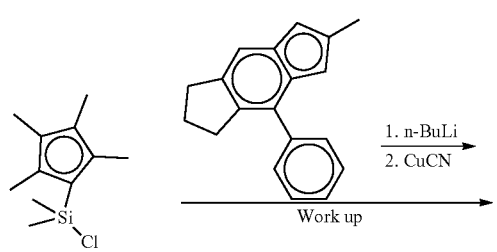

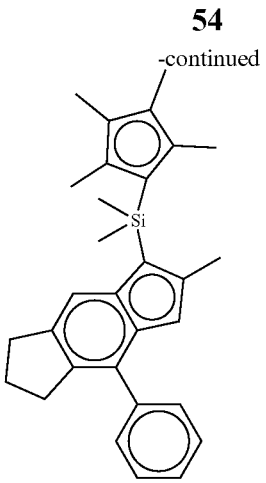

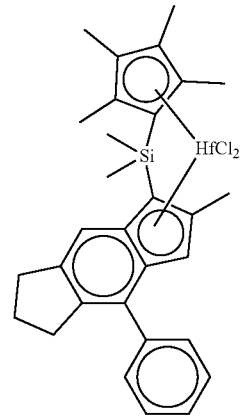

Preparation of Transition Metal Compound dimethylsilanediyl(2-methyl-4-phenyl-indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl₄ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl₃): 7.59-7.39 (m, 6H), 6.4 (s, 1H), 2.9-2.84 (m, 4H), 2.18 (s, 6H), 1.99 (m, 2H), 1.83 (s, 6H), 1.8 (s, 3H) 1.25 (s, 6H) ppm.

Example 15

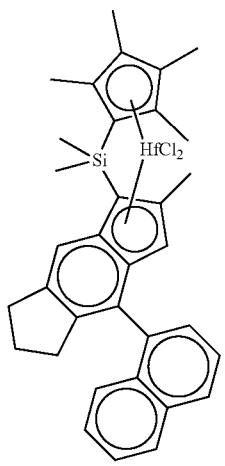

Preparation of Ligand Compound (2-methyl-4-(2'-naphthylene) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2'-naphthylene) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

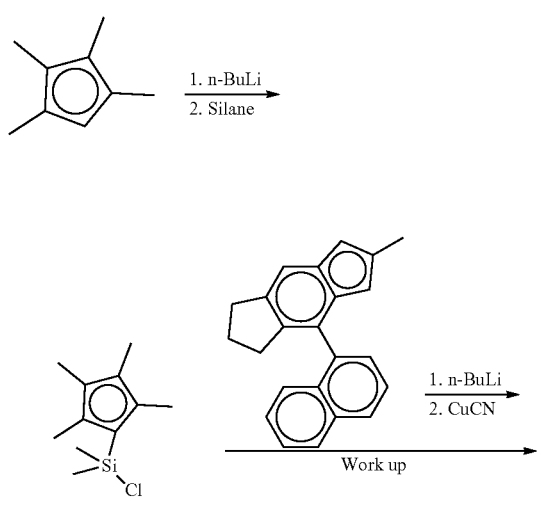

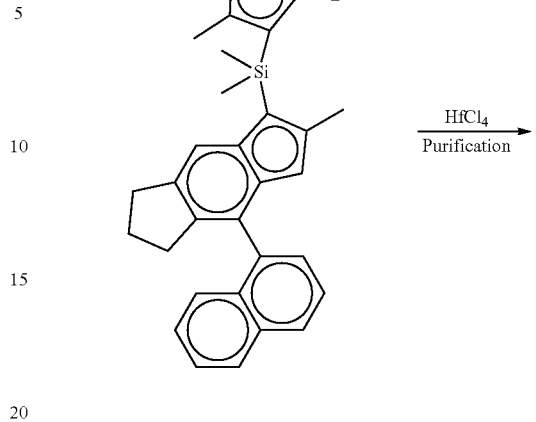

Preparation of Transition Metal Compound dimethylsilanediyl(2-methyl-4-(2'-naphthylene)indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing $HfCl_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, $CDCl_3$): 8.83 (d, 1H), 8.53 (d, 1H), 8.23-8.09 (m, 2H), 7.77 (t, 1H), 7.58-7.37 (m, 3H), 6.4 (s, 1H), 2.9-2.86 (m, 4H), 2.18 (s, 6H), 1.99 (m, 2H), 1.84 (s, 6H), 1.81 (s, 3H), 1.21 (s, 6H) ppm.

Example 16

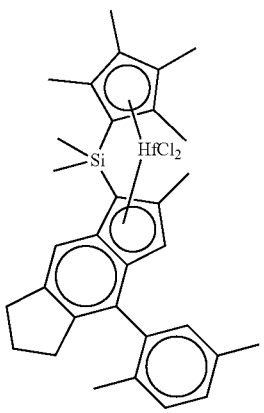

Preparation of Ligand Compound (2-methyl-4-(2', 5'-dimethylphenyl) indacenyl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(2',5'-dimethylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

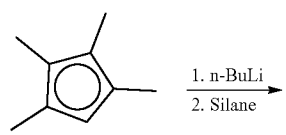

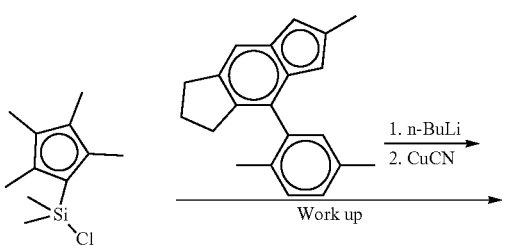

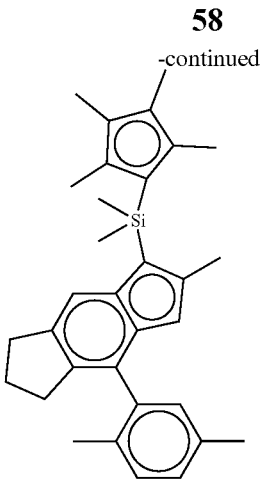

Preparation of Transition Metal Compound dimethylsilanediyl(2-methyl-4-(2',5'-dimethylphenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.76 (s, 1H), 7.54 (s, 1H), 7.35-7.25 (m, 2H), 6.41 (s, 1H), 2.89-2.83 (m, 4H), 2.48 (s, 3H), 2.3 (s, 3H), 2.18 (s, 6H), 1.98 (m, 2H), 1.83 (s, 6H), 1.84 (s, 3H), 1.25 (s, 6H) ppm.

Example 17

Preparation of Ligand Compound (2-methyl-4-(3', 5'-ditertbutylphenyl) indacenyl) 6-(tert-butoxy)-hexylmethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro 6-(tert-butoxy)-hexylmethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

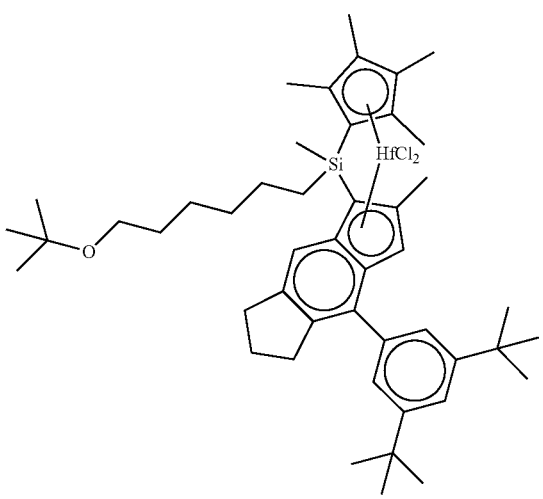

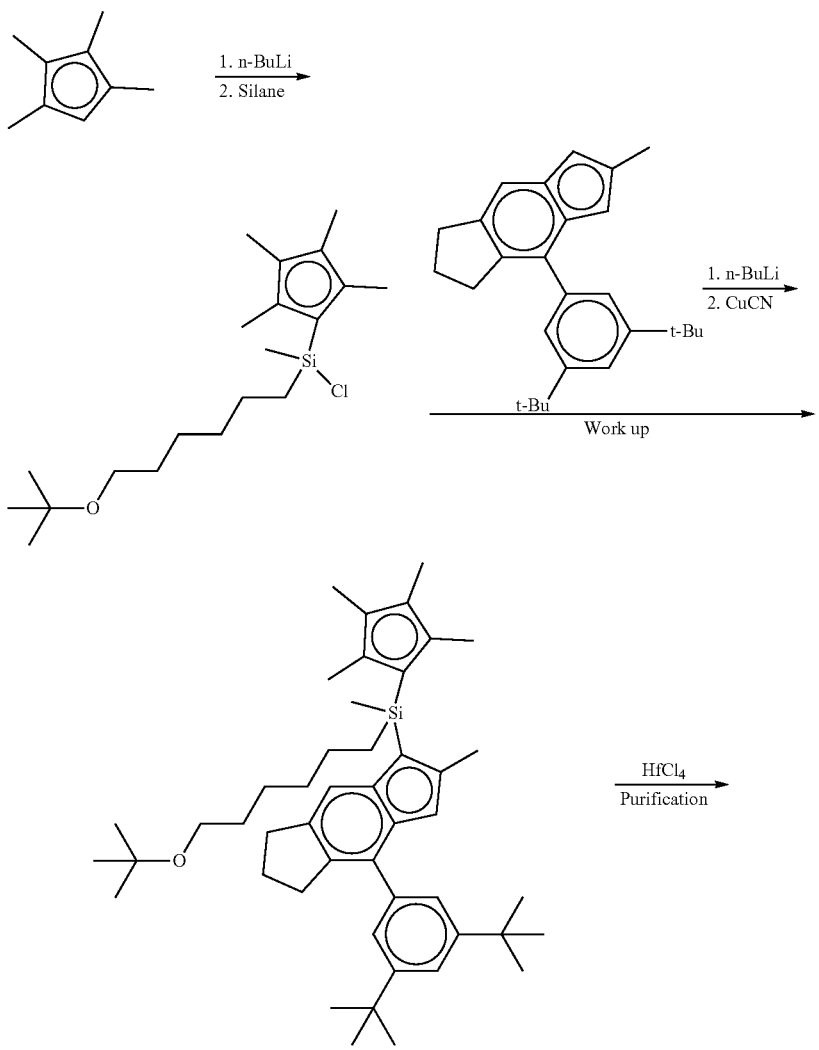

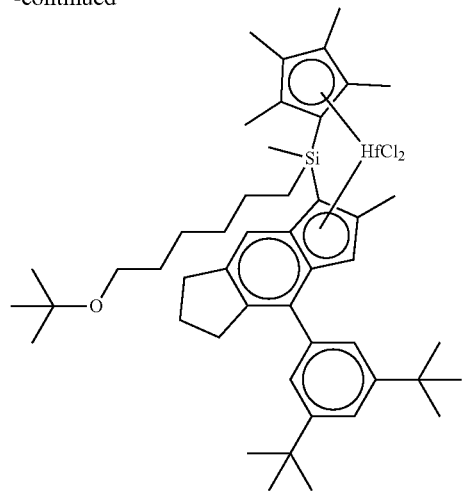

Preparation of Transition Metal Compound 6-(tert-butoxy)-hexylmethyl-silanediyl(2-methyl-4-(3',5'-ditertbutylphenyl) indacenyl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.76 (s, 2H), 7.59 (s, 1H), 7.48 (s, 1H), 6.4 (s, 1H), 3.28 (t, 2H), 2.9-2.83 (m, 4H), 2.15 (s, 6H), 1.96 (m, 2H), 1.82-1.52 (m, 13H), 1.38-1.23 (m, 22H), 1.28 (s, 9H), 0.96-0.86 (m, 5H) ppm.

Comparative Example 1

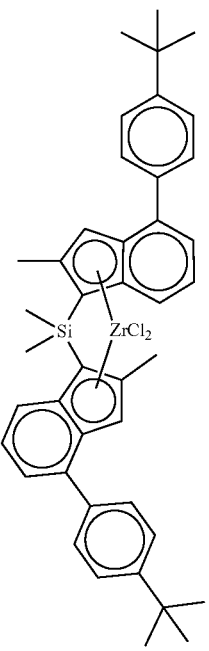

Preparation of Ligand Compound bis(2-methyl-4-(4'-(tert-butyl)-phenyl) inden-1-yl) silane 2-methyl-4-(4'-(tert-butyl)-phenyl) Indene (1 equiv) was dissolved in a mixed solution of toluene/THF (10/1 by volume, 0.3 M), and n-butyllithium (n-BuLi, 2.1 eq) was slowly added dropwise thereto at −25° C., followed by stirring at room temperature for 3 hours. Thereafter, CuCN (2 mol %) was added and stirred for 30 minutes, and then dichloro dimethyl silane (0.53 eq) was added thereto at −10° C., and stirred overnight at room temperature. Thereafter, it was stirred overnight at room temperature, worked up with water and dried to obtain a ligand.

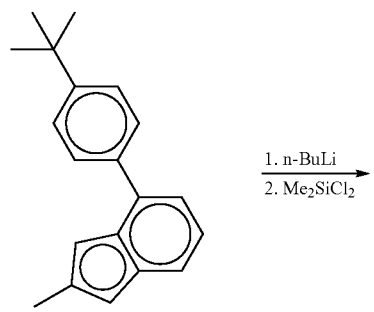

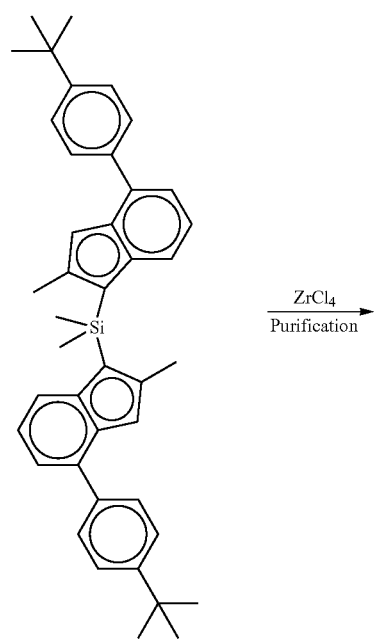

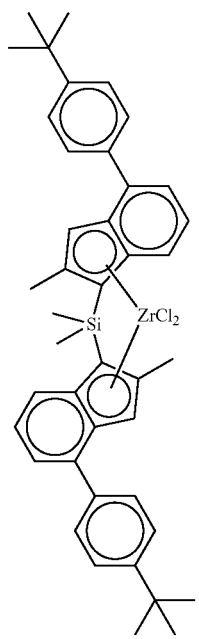

Preparation of Transition Metal Compound dimethylsilanediylbis(2-methyl-4-(4'-(tert-butyl)-phenyl) inden-1-yl) zirconium dichloride The ligand prepared above was dissolved in a mixed solution of toluene/Ether (10/1 by volume, 0.1 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Example 2

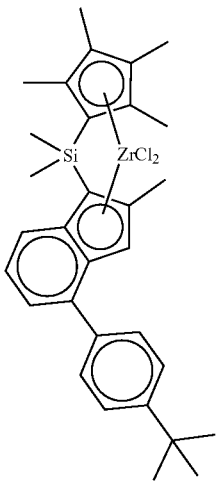

Preparation of Ligand Compound (2-methyl-4-(4'-(tert-butyl)-phenyl) inden-1-yl) dimethyl (2,3,4,5-tetramethyl cyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

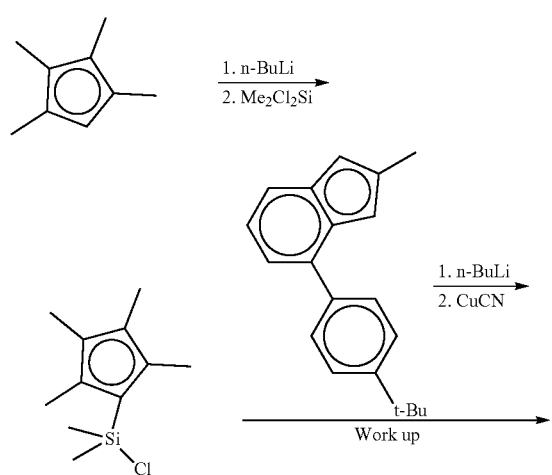

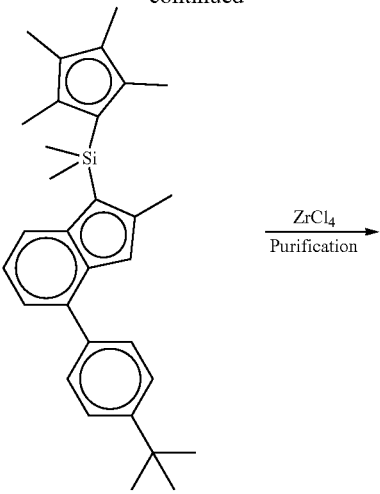

Preparation of Transition Metal Compound dimethylsilanediyl(2-methyl-4-(4'-(tert-butyl)-phenyl) inden-1-yl) (2,3,4,5-tetramethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

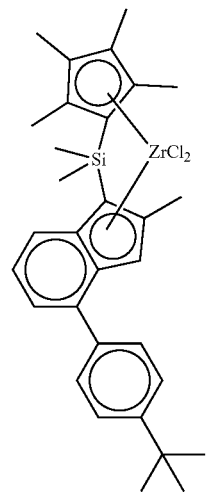

Comparative Example 3

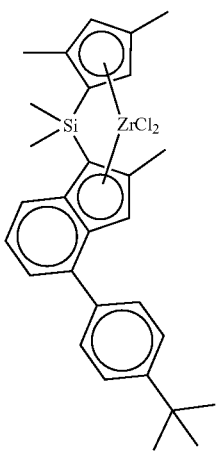

Preparation of ligand compound (2-methyl-4-(4'-(tert-butyl)-phenyl) inden-1-yl) dimethyl (2,4-dimethyl cyclopentadienyl) silane (2,4-dimethyl) cyclopentadiene (1 equiv) was dissolved in THF (0.3 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

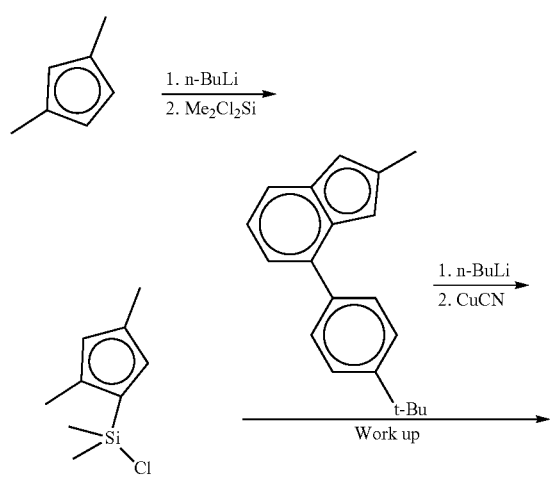

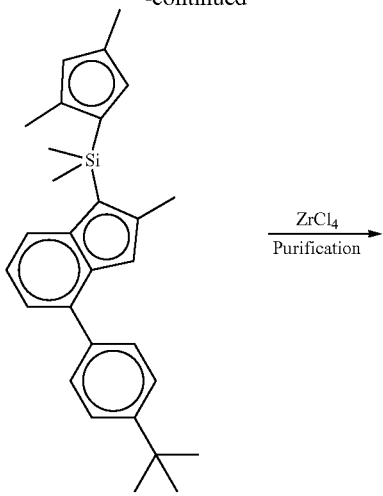

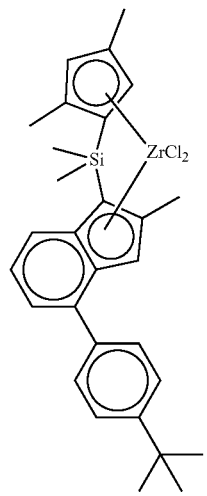

Preparation of Transition Metal Compound dimethylsilanediyl(2-methyl-4-(4'-(tert-butyl)-phenyl) inden-1-yl) (2,4-dimethyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Example 4

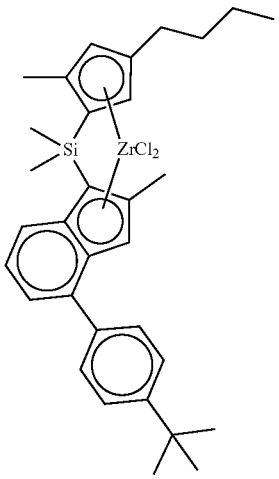

Preparation of Ligand Compound (2-methyl-4-(4'-(tert-butyl)-phenyl) inden-1-yl) dimethyl (2-methyl, 4-butyl cyclopentadienyl) silane (2-methyl-4-butyl) cyclopentadiene (1 equiv) was dissolved in THF (0.3 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

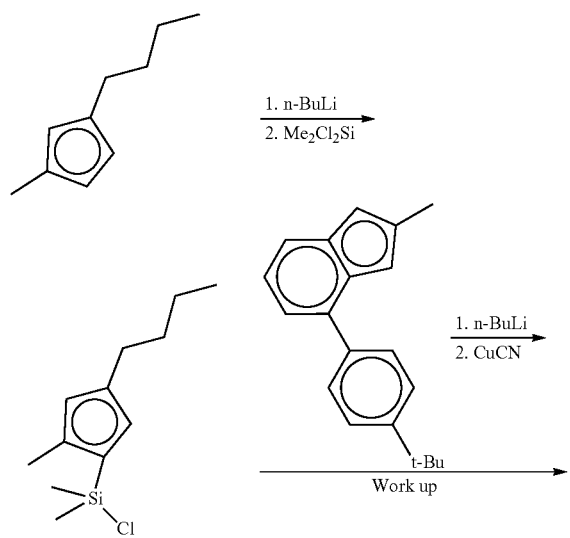

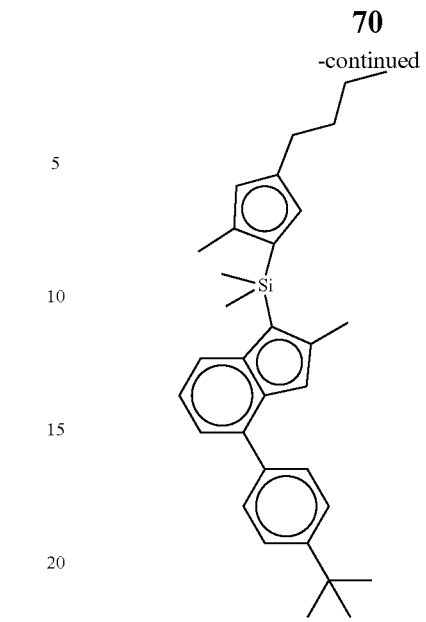

Preparation of Transition Metal Compound dimethylsilanediyl(2-methyl-4-(4'-(tert-butyl)-phenyl)Inden-1-yl)(2-methyl,4-butyl cyclopentadienyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

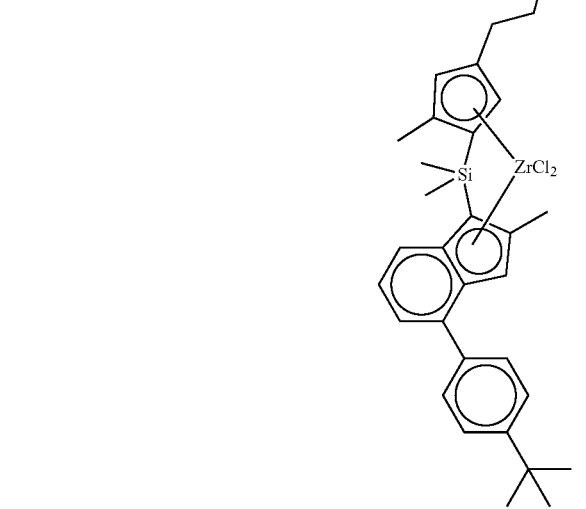

Comparative Example 5

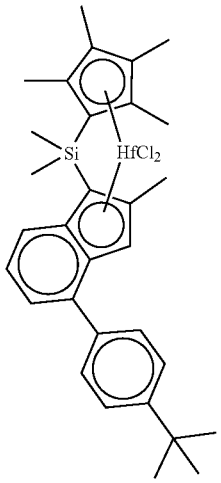

Preparation of Ligand Compound (2-methyl-4-(4'-(tert-butyl)-phenyl) inden-1-yl) dimethyl(2,3,4,5-tetramethyl cyclopentadienyl) silane (2,3,4,5-tetramethyl) cyclopentadiene (1 equiv) was dissolved in THF (0.3 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(4'-(tert-butyl)-phenyl) indene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

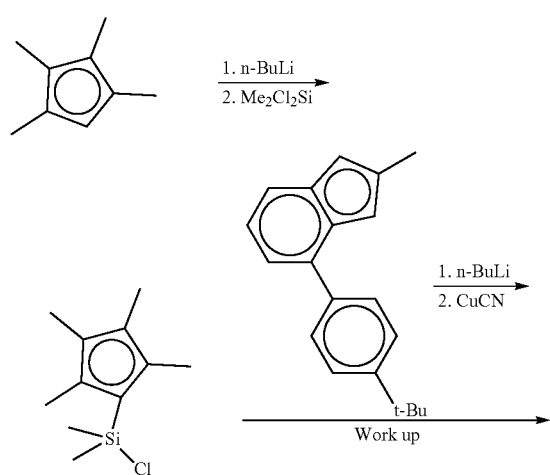

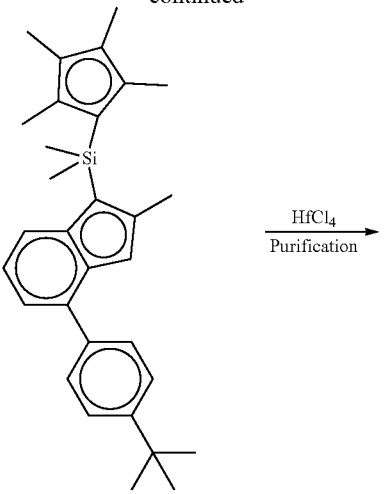

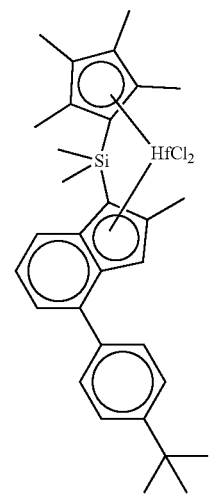

Preparation of Transition Metal Compound dimethylsilanediyl(2-methyl-4-(4'-(tert-butyl)-phenyl) inden-1-yl) (2,3,4,5-tetramethyl cyclopentadienyl) hafnium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing HfCl$_4$ (1 eq) with toluene (1.2 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

Comparative Example 6

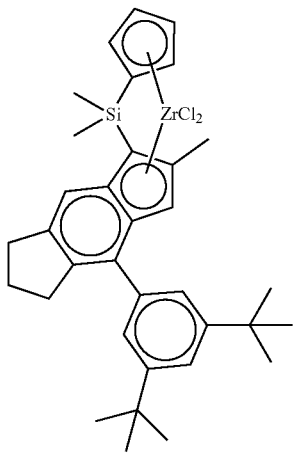

Preparation of Ligand Compound (2-methyl-4-(3,5-di-tert-butyl-phenyl) iIndacen-1-yl) dimethyl (cyclopentadienyl) silane Dicyclopentadiene was condensed through cracking at 150° C. to extract cyclopentadiene, and cyclopentadiene (1 equiv) was dissolved in THF (0.3 M). Then, n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

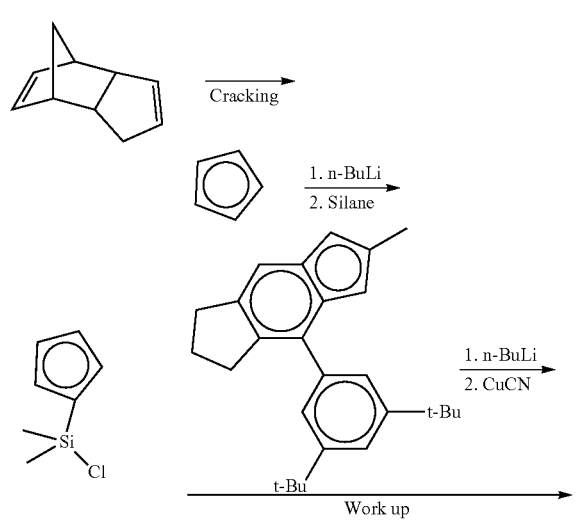

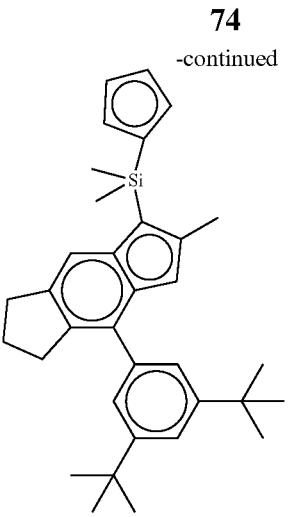

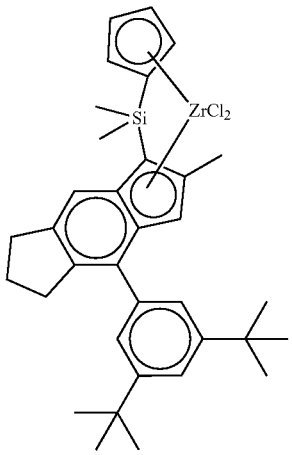

Preparation of Transition Metal Compound dimethyl-silanediyl(cyclopentadienyl)(2-methyl-4-(3,5-di-tert-butyl-phenyl) indacenyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.74 (s, 2H), 7.57 (s, 1H), 7.42 (s, 1H), 6.52 (dd, 2H), 6.42 (dd, 2H), 6.38 (s, 1H), 2.85-2.81 (m, 4H), 1.94 (m, 2H), 1.78 (s, 3H), 1.31 (s, 18H), 0.9 (s, 6H) ppm

Comparative Example 7

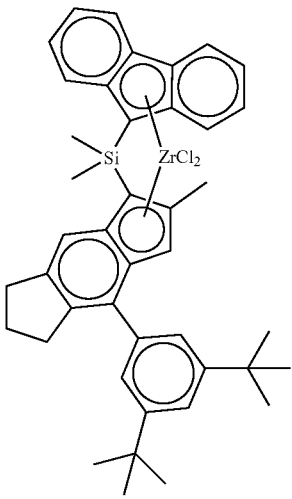

Preparation of Ligand Compound (2-methyl-4-(3,5-di-tert-butyl-phenyl) indacen-1-yl) dimethyl(cyclopentadienyl) silane Fluorene (1 equiv) was dissolved in THF (0.3 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-4-(3',5'-ditertbutylphenyl) indacene (1 eq) was dissolved in a mixed solution of toluene/THF (3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

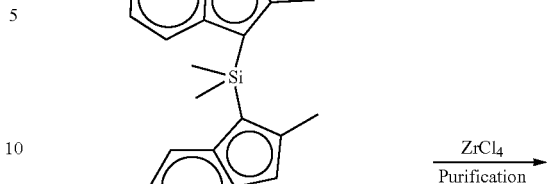

Preparation of Transition Metal Compound dimethyl-silanediyl(fluorenyl)(2-methyl-4-(3,5-di-tert-butyl-phenyl) indacenyl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.92 (d, 2H), 7.74 (s, 2H), 7.57 (s, 1H), 7.54 (d, 2H), 7.36-7.41 (m, 3H), 7.24-7.27 (m, 2H), 6.37 (s, 1H), 2.85-2.80 (m, 4H), 1.94 (m, 2H), 1.77 (s, 3H), 1.31 (s, 18H), 0.91 (s, 6H) ppm

Comparative Example 8

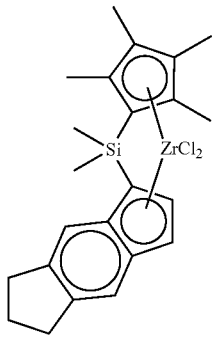

Preparation of Ligand Compound (s-Indacen-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 1,2,3,5-tetrahydro-s-indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

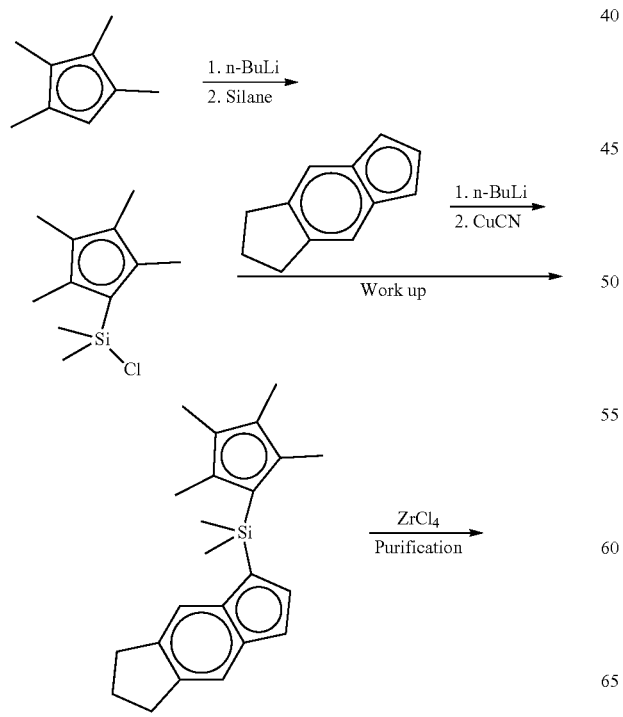

Preparation of Transition Metal Compound dimethyl-silanediyl(tetramethylcyclopentadienyl)(s-indacen-1-yl) zirconium dichloride

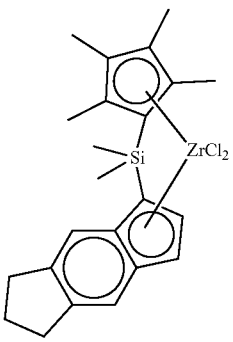

The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.33 (s, 1H), 7.28 (s, 1H), 6.59 (dd, 1H), 6.40 (dd, 1H), 6.38 (s, 1H), 2.86-2.80 (m, 4H), 2.12 (s, 6H), 2.10 (m, 2H), 1.88 (s, 6H), 0.99 (s, 6H) ppm.

Comparative Example 9

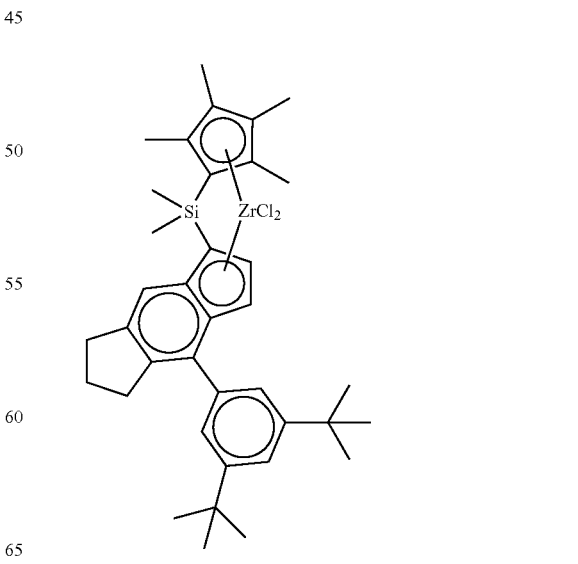

Preparation of Ligand Compound (4-(3,5-di-tert-butyl-phenyl)-s-indacen-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 4-(3,5-di-tert-butyl-phenyl)-1,5,6,7-tetrahydro-s-indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound dimethyl-silanediyl(tetramethylcyclopentadienyl)(4-(3,5-di-tert-butyl-phenyl)-s-indacen-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

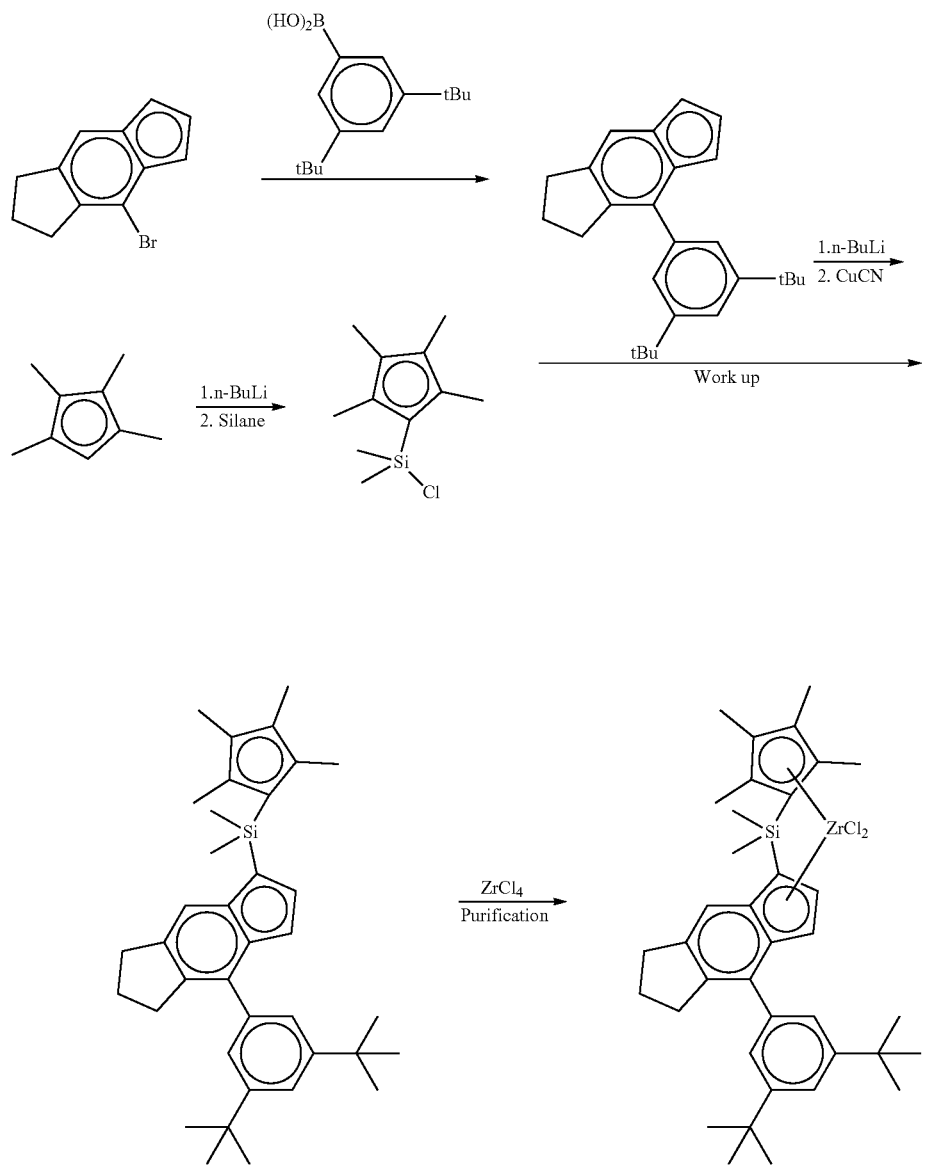

¹H-NMR (500 MHz, CDCl₃): 7.73 (s, 2H), 7.56 (s, 1H), 7.41 (s, 1H), 6.51 (dd, 2H), 6.41 (dd, 2H), 2.87-2.79 (m, 4H), 2.11 (s, 6H), 2.10 (m, 2H), 1.86 (s, 6H), 1.30 (s, 18H), 0.98 (s, 6H) ppm.

Comparative Example 10

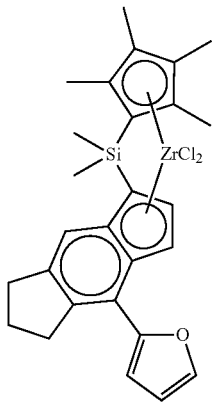

Preparation of Ligand Compound (4-Furyl-s-indacen-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 4-furyl-1,5,6,7-tetrahydro-s-indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

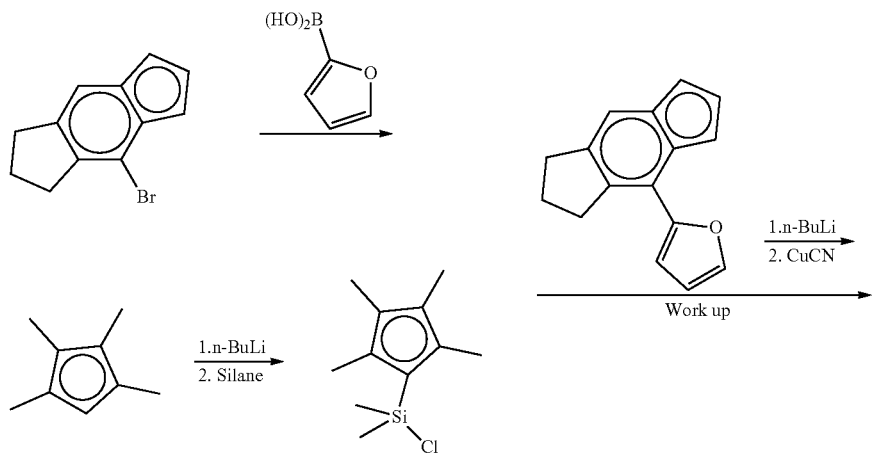

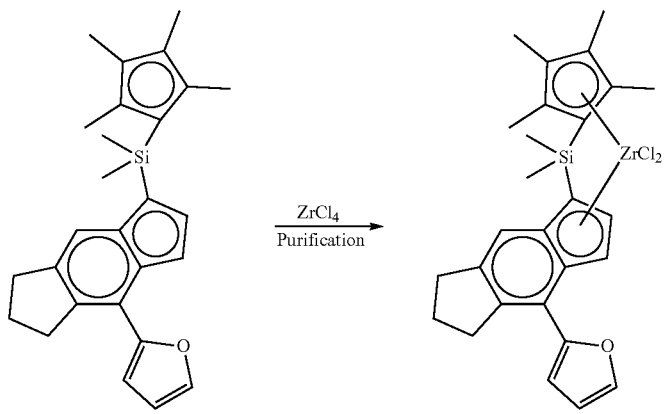

Preparation of Transition Metal Compound dimethyl-silanediyl(tetramethylcyclopentadienyl)(4-furyl-s-indacen-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.78 (d, 1H), 7.41 (s, 1H), 7.00 (d, 1H), 6.58 (d, 1H), 6.52 (dd, 2H), 6.42 (dd, 2H), 2.85-2.78 (m, 4H), 2.10 (s, 6H), 2.08 (m, 2H), 1.82 (s, 6H), 0.99 (s, 6H) ppm.

Comparative Example 11

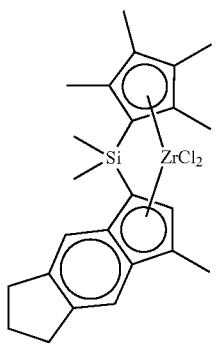

Preparation of Ligand Compound
(3-Methyl-s-Indacen-1-yl) dimethyl
(tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 1-methyl-s-Indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

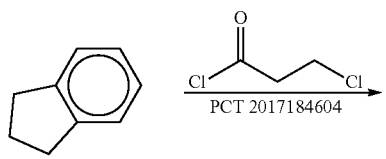

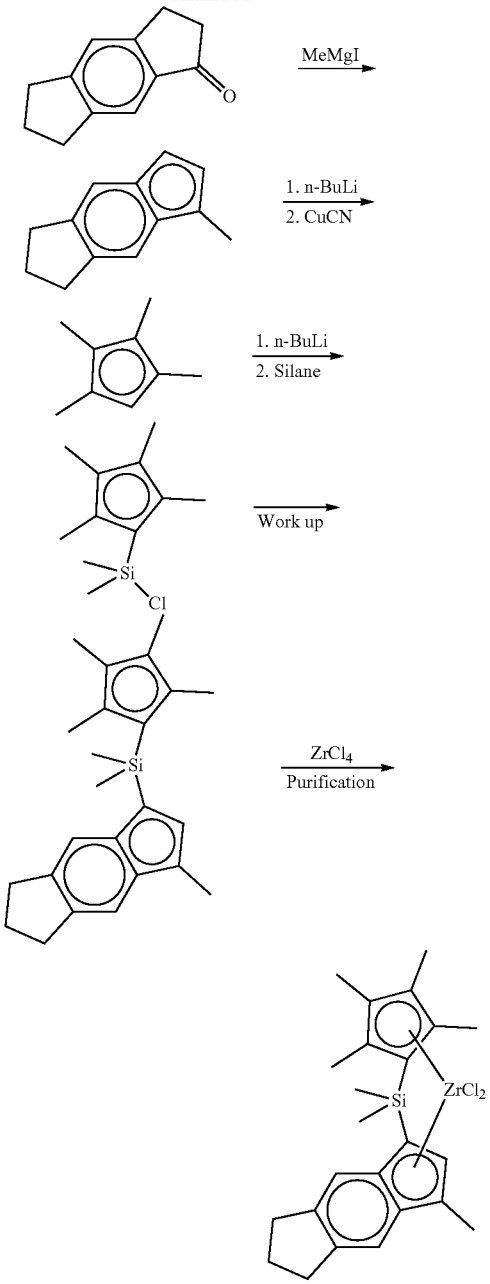

Preparation of Transition Metal Compound dimethyl-silanediyl(tetramethylcyclopentadienyl)(3-methyl-s-indacen-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

¹H-NMR (500 MHz, CDCl₃): 7.32 (s, 1H), 7.24 (s, 1H), 6.21 (s, 1H), 2.86-2.82 (m, 4H), 2.12 (s, 6H), 2.08 (m, 2H), 2.00 (s, 3H), 1.79 (s, 6H), 0.99 (s, 6H) ppm.

Comparative Example 12

Preparation of Ligand Compound (2-methyl-s-indacen-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-s-Indacene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

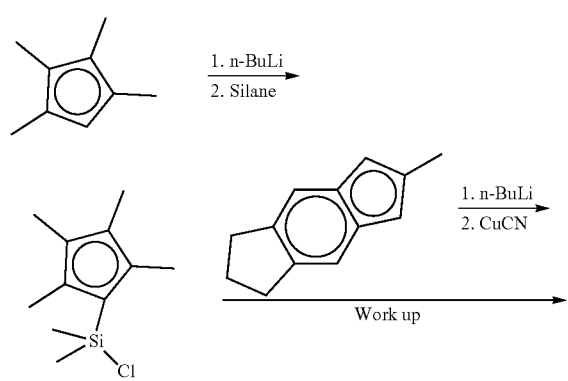

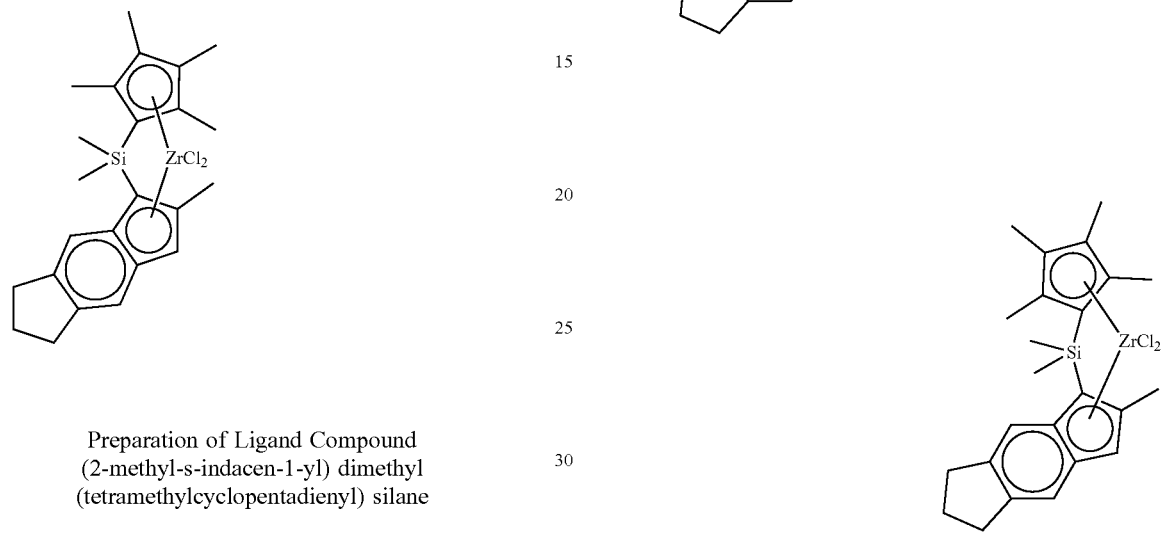

Preparation of Transition Metal Compound dimethyl-silanediyl(tetramethylcyclopentadienyl)(2-methyl-s-indacen-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

¹H-NMR (500 MHz, CDCl₃): 7.32 (s, 1H), 7.24 (s, 1H), 6.50 (s, 1H), 2.86-2.82 (m, 4H), 2.12 (s, 6H), 2.07 (m, 2H), 2.00 (s, 3H), 1.88 (s, 6H), 0.97 (s, 6H) ppm.

Comparative Example 13

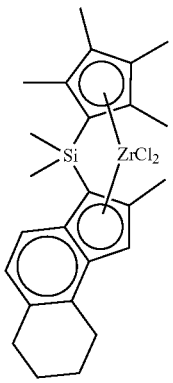

Preparation of Ligand Compound (2-methyl-5,6,7,8-tetrahydrobenzoindene-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-5,6,7,8-tetrahydrobenzoindene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

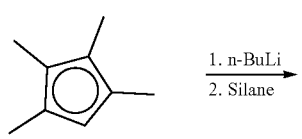

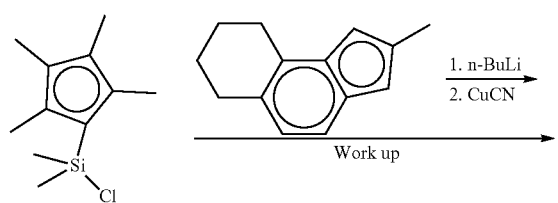

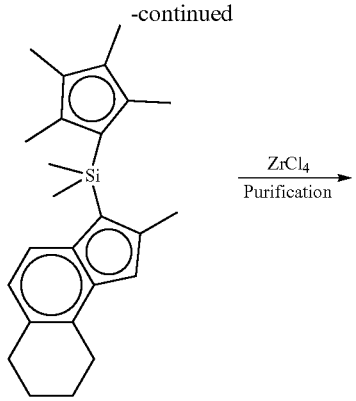

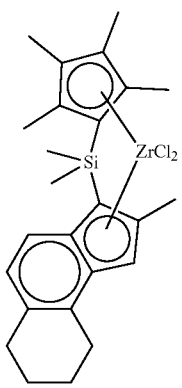

Preparation of Transition Metal Compound dimethyl-silanediyl(tetramethylcyclopentadienyl)(2-methyl-5,6,7,8-tetrahydrobenzoinden-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 6.99 (d, 1H), 6.82 (d, 1H), 6.48 (s, 1H), 2.83-2.78 (m, 4H), 2.11 (s, 6H), 1.92-1.88 (m, 4H), 1.88 (s, 6H), 0.98 (s, 6H) ppm.

Comparative Example 14

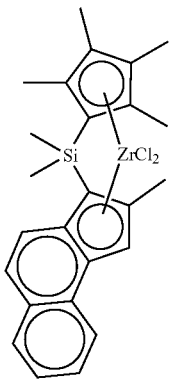

Preparation of Ligand Compound
(2-methyl-benzoinden-1-yl) dimethyl (tetramethylcyclopentadienyl) silane 2,3,4,5-tetramethylcyclopentadien (TMCP) was dissolved in tetrahydrofuran (THF), and n-butyllithium (n-BuLi, 1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-methyl-benzoindene (1 eq) was dissolved in a mixed solution of toluene/tetrahydrofuran (toluene/THF, 3/2 by volume, 0.5 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

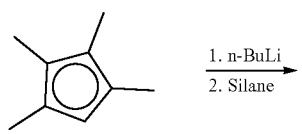

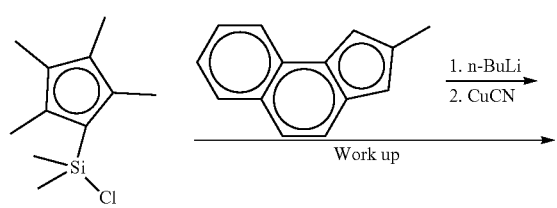

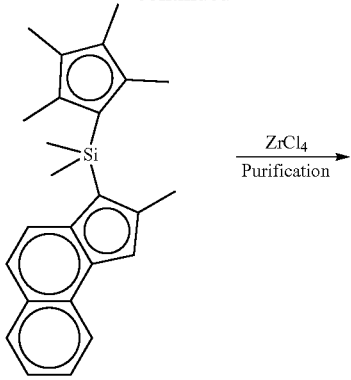

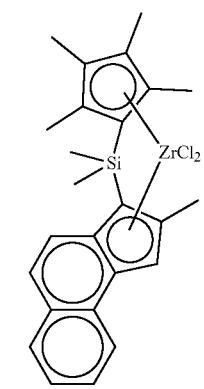

Preparation of Transition Metal Compound dimethyl-silanediyl(tetramethylcyclopentadienyl)(2-methyl-benzoinden-1-yl) zirconium dichloride The ligand prepared above was dissolved in a mixed solution of toluene/Ether (2/1 by volume, 0.53 M), and n-BuLi (2.05 eq) was added at −25° C., followed by stirring at room temperature for 5 hours. A slurry was prepared by mixing ZrCl4 (1 eq) with toluene (0.17 M) in a separate flask, and added to the ligand solution, followed by stirring overnight at room temperature. When the reaction was completed, the solvent was vacuum-dried, and dichloromethane was added thereto. Then, LiCl was removed through a filter, the filtrate was vacuum-dried, and dichloromethane/hexane was added thereto, followed by recrystallization at room temperature. The resulting solid was filtered and vacuum-dried to obtain the above metallocene compound.

$^1$H-NMR (500 MHz, CDCl$_3$): 7.88-7.80 (m, 3H), 7.63 (t, 1H), 7.41 (t, 1H), 7.11 (d, 1H), 6.40 (s, 1H), 2.11 (s, 6H), 2.02 (s, 3H), 1.87 (s, 6H), 0.98 (s, 6H) ppm

Preparation of Supported Catalyst 100 g of a silica support (Silica gel, SYLOPOL 952X, calcinated under 250° C.) was placed in a 2 L reactor under an argon (Ar) atmosphere, and 766 mL of methylaluminoxane (MAO) was slowly added at room temperature, followed by stirring at 90° C. for 15 hours. After completion of the reaction, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula.

700 µmol of each of the transition metal compounds prepared in Examples and Comparative Examples was dissolved in 400 mL of toluene, and transferred to the reactor using a cannula. After stirring at 50° C. for 5 hours, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula. This process was repeated twice. In the same manner, 400 mL of hexane was added thereto, stirred for 1 minute, and then allowed to stand for 15 minutes to decant the solvent using a cannula. Thereafter, an antistatic agent (Atmer 163, 3 g) was dissolved in 400 mL of hexane and then transferred to the reactor using a cannula. Thereafter, the solvent was removed by stirring at room temperature for 20 minutes and transferring it through a glass filter.

It was dried at room temperature under vacuum for 5 hours, and then dried at 45° C. under vacuum for 4 hours to obtain a supported catalyst.

<Homo Polypropylene Polymerization>

A 2 L stainless steel reactor was vacuum-dried at 65° C., and cooled down. Then, 3 mmol of triethylaluminum, hydrogen gas was added, and then 770 g of propylene were sequentially added at room temperature.

After stirring for 5 minutes, the temperature was raised to 70° C., and 30 mg of the supported metallocene catalyst was added to the reactor under a nitrogen pressure. Thereafter, the temperature of the reactor was raised slowly to 70° C., and a polymerization was performed for 1 hour. When the reaction was completed, unreacted propylene was ventilated.

Here, the amount of hydrogen gas added in the polymerization reaction of the homo polypropylene was so that the prepared homo polypropylene has a melt index (MI) of 7.5 g/10 min to 15 as the target physical properties of the resin composition for multifilaments, as shown in Table 1 below (Preparation Examples 1-1 to 1-17 and Comparative Preparation Examples 1-1 to 1-14), or so that the prepared homo polypropylene has a melt index (MI) of 25 g/10 min to 35 as the target physical properties of the resin composition for spunbonding, as shown in Table 2 below (Preparation Examples 2-1 to 2-17 and Comparative Preparation Examples 2-1 to 2-14).

The amounts of the hydrogen gas added in the polymerization processes of Preparation Examples 1-1 to 1-17 and 2-1 to 2-17 and Comparative Preparation Examples 1-1 to 1-14 and 2-1 to 2-14, in which propylene was homopolymerized using a supported metallocene catalyst prepared in Examples and Comparative Examples-1 to 2-14, are as shown in Tables 1 and 2 below, respectively.

The activity of the supported metallocene catalysts in the polymerization processes of Preparation Examples 1-1 to 1-17 and 2-1 to 2-17 and Comparative Preparation Examples 1-1 to 1-14 and 2-1 to 2-14, using one of the transition metal compounds prepared in Examples and Comparative Examples, and physical properties of the homo polypropylenes prepared therefrom were evaluated in the following manner.

(1) Activity (Activity, kg PP/g cat·hr)

The activity of the supported metallocene catalysts was calculated as the ratio of the weight (kg PP) of the homopolypropylene produced per the weight (g) of the supported catalyst used based on the unit time (h).

(2) Melt Index (MI)

The melt index was measured at 230° C. under a load of 2.16 kg according to the American Society for Testing and Materials ASTM D1238, and expressed as the weight (g) of the polymer that has been melted for 10 minutes.

(3) Melting Point (Tm)

The melting temperature, and melting point (Tm) of the propylene polymer were measured using differential scanning calorimeter (DSC 2920, manufactured by TA instrument). Specifically, the temperature was increased to 220° C., and maintained at that temperature for 5 minutes. After that, the temperature was lowered to 20° C., and further increased. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

(4) Molecular weight distribution (MWD, polydispersity index) The molecular weight distribution (MWD) was determined by measuring a weight average molecular weight (Mw) and a number average molecular weight (Mn) of the polymer using gel permeation chromatography (GPC, manufactured by Water), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polymer sample of Examples and Comparative Examples was pretreated by dissolving in 1,2,4-trichlorobenzene containing 0.0125% of BHT at 160° C. for 10 hours using a GPC analyzer (PL-GP220), and the sample with a concentration of 10 mg/10 mL was supplied in an amount of 200 µL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

First, the homopolymerization of propylene of Preparation Examples 1-1 to 1-17 and Comparative Preparation Examples 1-1 to 1-14 was performed using the metallocene-supported catalyst of Examples and Comparative Examples, along with applying the amount of hydrogen gas input differently in the range from about 7.5 g/10 min to 15 g/10 min of the melt index ($MI_{2.16}$) for manufacturing multifilaments. The results of the evaluation for the physical properties of the homo polypropylene resin composition prepared therefrom are shown in Table 1 below.

TABLE 1

|  | Catalyst | $H_2$ (ppm) | Activity (kg/g-cat · h) | MI (g/10 min) | Tm (° C.) | Mw (g/mol) | MWD |
|---|---|---|---|---|---|---|---|
| Preparation Example 1-1 | Example 1 | 400 | 15.8 | 10.8 | 156 | 288000 | 2.33 |
| Preparation Example 1-2 | Example 2 | 400 | 14.6 | 10 | 156 | 298000 | 2.28 |

TABLE 1-continued

| | Catalyst | H₂ (ppm) | Activity (kg/g-cat · h) | MI (g/10 min) | Tm (° C.) | Mw (g/mol) | MWD |
|---|---|---|---|---|---|---|---|
| Preparation Example 1-3 | Example 3 | 350 | 15.4 | 11.2 | 155 | 281000 | 2.3 |
| Preparation Example 1-4 | Example 4 | 500 | 14.2 | 10.6 | 155 | 288000 | 2.33 |
| Preparation Example 1-5 | Example 5 | 300 | 15.4 | 11 | 154 | 278000 | 2.33 |
| Preparation Example 1-6 | Example 6 | 350 | 15.6 | 10.2 | 156 | 285000 | 2.25 |
| Preparation Example 1-7 | Example 7 | 500 | 14.4 | 9.8 | 156 | 301000 | 2.28 |
| Preparation Example 1-8 | Example 8 | 400 | 13.8 | 11 | 155 | 283000 | 2.4 |
| Preparation Example 1-9 | Example 9 | 500 | 12 | 9.8 | 156 | 310000 | 2.39 |
| Preparation Example 1-10 | Example 10 | 400 | 12.3 | 10.5 | 155 | 288000 | 2.38 |
| Preparation Example 1-11 | Example 11 | 200 | 18 | 10.7 | 153 | 286000 | 2.39 |
| Preparation Example 1-12 | Example 12 | 500 | 11.5 | 9.7 | 157 | 311000 | 2.3 |
| Preparation Example 1-13 | Example 13 | 500 | 11.8 | 9.5 | 157 | 313000 | 2.3 |
| Preparation Example 1-14 | Example 14 | 400 | 10.8 | 10.2 | 157 | 302000 | 2.32 |
| Preparation Example 1-15 | Example 15 | 600 | 10.6 | 9.3 | 157 | 333000 | 2.34 |
| Preparation Example 1-16 | Example 16 | 400 | 11.8 | 11.8 | 156 | 268000 | 2.28 |
| Preparation Example 1-17 | Example 17 | 200 | 15 | 11.2 | 155 | 284000 | 2.39 |
| Comparative Preparation Example 1-1 | Comparative Example 1 | 800 | 7.8 | 10.5 | 153 | 284000 | 2.5 |
| Comparative Preparation Example 1-2 | Comparative Example 2 | 10 | 7.2 | 12.3 | 151 | 251000 | 2.92 |
| Comparative Preparation Example 1-3 | Comparative Example 3 | 10 | 5.8 | 8.2 | 146 | 322000 | 2.68 |
| Comparative Preparation Example 1-4 | Comparative Example 4 | 10 | 8 | 7.6 | 147 | 362000 | 2.84 |
| Comparative Preparation Example 1-5 | Comparative Example 5 | 0 | 1 | 8 | 154 | 325000 | 2.8 |
| Comparative Preparation Example 1-6 | Comparative Example 6 | 0 | 0.7 | not measurable | — | 12000 | 4.25 |
| Comparative Preparation Example 1-7 | Comparative Example 7 | 0 | 0.8 | 3000 | 143 | 51000 | 3.2 |
| Comparative Preparation Example 1-8 | Comparative Example 8 | 0 | 1.1 | 800 | 132 | 121000 | 3.02 |
| Comparative Preparation Example 1-9 | Comparative Example 9 | 0 | 1.5 | 800 | 135 | 108000 | 3.01 |
| Comparative Preparation Example 1-10 | Comparative Example 10 | 0 | 1.3 | 2000 | 130 | 96000 | 3.21 |
| Comparative Preparation Example 1-11 | Comparative Example 11 | 150 | 8 | 11 | 145 | 286000 | 2.83 |
| Comparative Preparation Example 1-12 | Comparative Example 12 | 300 | 8.3 | 11.8 | 152 | 301000 | 2.48 |
| Comparative Preparation Example 1-13 | Comparative Example 13 | 50 | 3.2 | 10.9 | 148 | 268000 | 2.39 |
| Comparative Preparation Example 1-14 | Comparative Example 14 | 100 | 5.4 | 11.8 | 147 | 259000 | 2.39 |

In Table 1, for the physical properties of the homopolypropylene for manufacturing multifilaments, it is the key to achieving a high melting point (Tm) suitable for fibers and low molecular weight distribution (MWD) for reducing the fiber breaking after controlling the hydrogen input amount to adjust the melt index ($MI_{2.16}$, approximately, Mw is from the late 200,000s to the early 300,000s), As shown in Table 1, the metallocene compounds of Examples 1 to 17 used in the polymerization process of Preparation Examples 1-1 to 1-17 according to an embodiment of the present disclosure include a ligand of an indacene structure. Then, the molecular weight is relatively large compared to the metallocene compounds having a ligand of an indene structure. Therefore, the metallocene compounds according to the present disclosure can be used for preparing various products. Due to its high activity, the processing area according to hydrogen reactivity is very wide and the relative production is high. In addition, since the molecular weight distribution (MWD) is narrow, it is very advantageous for the production of multifilament fibers, and the occurrence of fiber breaking can be significantly reduced.

In particular, the metallocene compounds of Examples 1 to 17 used in the polymerization process of Preparation Examples 1-1 to 1-17 according to an embodiment of the present disclosure has a structure by introducing an indacene ligand with specific substituents along with the C1-symmetric structure known to secure a molecular weight distribution (MWD) of 2.5 or more when applied to the polypropylene polymerization (under the condition of intruding $H_2$). Thereby, a molecular weight distribution (MWD) of polypropylene was secured as 2.4 or less by introducing the above specific structures and substituents. The narrow molecular weight distribution of the resin composition is an essential property for a high-speed spinning process for manufacturing multifilament fibers. In addition, the metallocene catalysts secured high catalytic activities compared to known similar catalysts due to the indacenyl ligand thereof. Then, the process stability and catalyst cost can be reduced significantly. Further, it is possible to improve the thermal stability of the prepared fiber by securing a high melting point (Tm) of 155° C. or more depending on the specific substituents.

On the other hand, in Comparative Preparation Examples 1-1 to 1-14 using the metallocene catalysts of Comparative Examples 1 to 14, which includes the indenyl ligand instead of the indacenyl ligand or the indacenyl ligand without the specific substituents, the melt index for manufacturing multifilaments was not secured or, even though adjusting the melt index to the range for manufacturing multifilaments, the catalytic activity was significantly reduced, the molecular weight distribution (MWD) was increased, and the melting point (Tm) was lowered. In general, when hydrogen gas is added, the weight average molecular weight (Mw) tends to be lower. However, in Comparative Preparation Examples 1-5 to 1-10, the weight average molecular weight (Mw) was lowered even though no hydrogen gas was added. Therefore, it is confirmed that Comparative Preparation Examples 1-5 to 1-10 could not provide the resin composition for multifilament fibers.

Meanwhile, the homopolymerization of propylene of Preparation Examples 2-1 to 2-14 and Comparative Preparation Examples 2-1 to 2-13 was performed using the metallocene-supported catalyst of Examples and Comparative Examples, along with applying the amount of hydrogen gas input differently in the range from about 25 g/10 min to 35 g/10 min of the melt index ($MI_{2.16}$) for manufacturing spunbond fibers. The results of the evaluation for the physical properties of the homo polypropylene resin composition prepared therefrom are shown in Table 2 below.

TABLE 2

| | Catalyst | $H_2$ (ppm) | Activity (kg/g-cat · h) | MI (g/10 min) | Tm (° C.) | Mw (g/mol) | MWD |
|---|---|---|---|---|---|---|---|
| Preparation Example 2-1 | Example 1 | 450 | 18.5 | 30 | 156 | 194000 | 2.33 |
| Preparation Example 2-2 | Example 2 | 450 | 16.8 | 29.5 | 156 | 205000 | 2.29 |
| Preparation Example 2-3 | Example 3 | 400 | 17.3 | 29.8 | 155 | 195000 | 2.3 |
| Preparation Example 2-4 | Example 4 | 550 | 16.1 | 30.2 | 156 | 190000 | 2.33 |
| Preparation Example 2-5 | Example 5 | 350 | 16.9 | 31.5 | 154 | 201000 | 2.33 |
| Preparation Example 2-6 | Example 6 | 400 | 17.1 | 30 | 156 | 195000 | 2.25 |
| Preparation Example 2-7 | Example 7 | 550 | 16 | 28.8 | 156 | 208000 | 2.28 |
| Preparation Example 2-8 | Example 8 | 450 | 14 | 32.1 | 155 | 194000 | 2.4 |
| Preparation Example 2-9 | Example 9 | 550 | 13.2 | 32.1 | 156 | 188000 | 2.39 |
| Preparation Example 2-10 | Example 10 | 450 | 13.8 | 34 | 154 | 179000 | 2.39 |
| Preparation Example 2-11 | Example 11 | 220 | 20.1 | 29.5 | 153 | 198000 | 2.39 |
| Preparation Example 2-12 | Example 12 | 550 | 13.5 | 28.5 | 157 | 208000 | 2.3 |
| Preparation Example 2-13 | Example 13 | 550 | 12.2 | 29.9 | 157 | 196000 | 2.31 |
| Preparation Example 2-14 | Example 14 | 450 | 11.8 | 30 | 157 | 190000 | 2.32 |
| Preparation Example 2-15 | Example 15 | 700 | 11.6 | 28.8 | 157 | 197000 | 2.33 |
| Preparation Example 2-16 | Example 16 | 450 | 12.4 | 29.5 | 157 | 198000 | 2.29 |

TABLE 2-continued

|  | Catalyst | H$_2$ (ppm) | Activity (kg/g-cat · h) | MI (g/10 min) | Tm (° C.) | Mw (g/mol) | MWD |
|---|---|---|---|---|---|---|---|
| Preparation Example 2-17 | Example 17 | 220 | 15.4 | 25.8 | 155 | 220000 | 2.39 |
| Comparative Preparation Example 2-1 | Comparative Example 1 | 1000 | 8 | 28.2 | 152 | 201000 | 2.48 |
| Comparative Preparation Example 2-2 | Comparative Example 2 | 30 | 8 | 30.5 | 151 | 192000 | 2.91 |
| Comparative Preparation Example 2-3 | Comparative Example 3 | 40 | 6.2 | 32 | 146 | 179000 | 2.66 |
| Comparative Preparation Example 2-4 | Comparative Example 4 | 50 | 8.1 | 35.1 | 147 | 174000 | 2.88 |
| Comparative Preparation Example 2-5 | Comparative Example 5 | 10 | 1.2 | 34.2 | 154 | 168000 | 2.82 |
| Comparative Preparation Example 2-6 | Comparative Example 6 | 0 | 1.2 | not measurable | — | 12000 | 4.25 |
| Comparative Preparation Example 2-7 | Comparative Example 7 | 0 | 0.8 | 3000 | 143 | 510000 | 3.2 |
| Comparative Preparation Example 2-8 | Comparative Example 8 | 0 | 2.1 | 800 | 132 | 121000 | 3.02 |
| Comparative Preparation Example 2-9 | Comparative Example 9 | 0 | 1.5 | 800 | 135 | 108000 | 3.01 |
| Comparative Preparation Example 2-10 | Comparative Example 10 | 0 | 1.3 | 2000 | 130 | 96000 | 3.21 |
| Comparative Preparation Example 2-11 | Comparative Example 11 | 200 | 8.1 | 29.8 | 145 | 188000 | 2.81 |
| Comparative Preparation Example 2-12 | Comparative Example 12 | 330 | 8.4 | 28.5 | 151 | 200000 | 2.47 |
| Comparative Preparation Example 2-13 | Comparative Example 13 | 60 | 3.5 | 30.1 | 148 | 191000 | 2.39 |
| Comparative Preparation Example 2-14 | Comparative Example 14 | 110 | 6.1 | 30.8 | 148 | 184000 | 2.38 |

As shown in Table 2, the metallocene compounds of Examples 1 to 17 used in the polymerization process of Preparation Examples 1-1 to 1-17 according to an embodiment of the present disclosure include a ligand of an indacene structure with a specific substituent. Then, the molecular weight distribution (MWD) appears as narrow as 2.4 or less, and when spinning with a spunbond fiber used for manufacturing a nonwoven fabric, the occurrence of fiber breaking can be significantly reduced.

On the other hand, in Comparative Preparation Examples 1-1 to 1-14 using the metallocene catalysts of Comparative Examples 1 to 14, which includes the indenyl ligand instead of the indacenyl ligand or the indacenyl ligand without the specific substituents, the molecular weight distribution (MWD) was increased, and the melting point (Tm) was lowered due to a relatively low degree of stereoregularity. In addition, it was confirmed that it is very difficult to adjust the melt index (MI$_{2.16}$) through hydrogen control because the basic molecular weight is low and a sharp change in the melt index (MI$_{2.16}$) occurs due to a minute change in the amount of hydrogen gas. Compared to these properties, in the examples according to an embodiment of the present disclosure, it can be seen that as hydrogen gas is added, the activity of the catalyst is further increased. Therefore, in the examples according to an embodiment of the present disclosure, the amount of hydrogen gas can be easily controlled, so it is very advantageous to produce a product having the desired range of melt index (MI$_{2.16}$).

In particular, in Comparative Preparation Example 2-6 using the metallocene catalyst of Comparative Example 6, atactic polypropylene (atactic PP) was produced and the molecular weight of the polypropylene was very lowered. Also, in Comparative Preparation Example 2-7 using the metallocene catalyst of Comparative Example 7, the activity was too low and a melt index (MI$_{2.16}$) having a desired molecular weight could not be obtained even without adding a hydrogen gas. Further, in Comparative Preparation Examples 2-8 to 2-10 using the metallocene catalysts of Comparative Example 8 to 10, in which there is no 2-position substituent of indacenyl ligand, since tacticity was collapsed, the melting point (Tm) was lowered remarkably and the melt index (MI$_{2.16}$) having a desired molecular weight could not be obtained. In Comparative Preparation Example 2-11, compared to the examples according to an embodiment of the present disclosure, the melting point (Tm) and activity were lowered, and the molecular weight distribution (MWD) was wide, which is a factor unfavorable to fiber production. In Comparative Preparation Example 2-12, the target molecular weight could be secured, but the catalytic activity was lowered compared to the examples according to an embodiment of the present disclosure. Also, in Comparative Preparation Examples 2-13 to 2-14, it was confirmed that the activity and the melting point (Tm) were low. In particular, since the weight average molecular weight (Mw) tends to be lower when hydrogen is added, the weight average molecular weight (Mw) is low even though hydrogen is not added at all, in Comparative Preparation Examples 2-6 to 2-10. Therefore, it could not be possible to secure the desired resin composition because the target molecular weight was not satisfied.

The invention claimed is:

1. A transition metal compound represented by Chemical Formula 1:

[Chemical Formula 1]

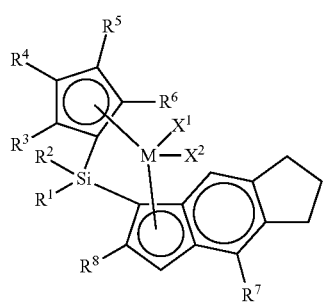

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is a substituted or unsubstituted $C_{6-20}$ aryl, and $R^8$ is $C_{1-20}$ alkyl.

2. The transition metal compound of claim 1, wherein M is zirconium (Zr) or hafnium (Hf).

3. The transition metal compound of claim 1, wherein $R^1$ and $R^2$ are each independently $C_{1-8}$ linear or branched alkyl, $C_{2-12}$ linear or branched alkoxyalkyl, or $C_{6-12}$ aryl.

4. The transition metal compound of claim 1, wherein $R^3$ to $R^6$ are each independently $C_{1-6}$ linear or branched alkyl.

5. The transition metal compound of claim 1, wherein $R^7$ is phenyl, phenyl substituted with $C_{1-6}$ linear or branched alkyl, naphthyl, or naphthyl substituted with $C_{1-6}$ linear or branched alkyl.

6. The transition metal compound of claim 1, wherein $R^8$ is $C_{1-6}$ linear or branched alkyl.

7. The transition metal compound of claim 1, which is represented by Chemical Formula 1-1:

[Chemical Formula 1-1]

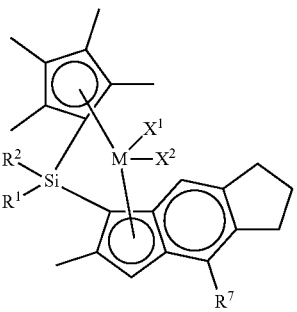

in Chemical Formulae 1-1,

M, $X^1$, $X^2$, $R^1$, $R^2$, and $R^7$ are as defined in Chemical Formula 1.

8. The transition metal compound of claim 1, which is any one of compounds represented by the following structural formulae:

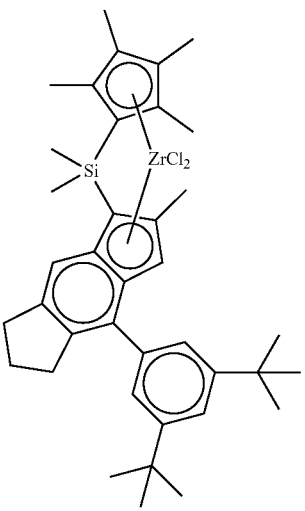

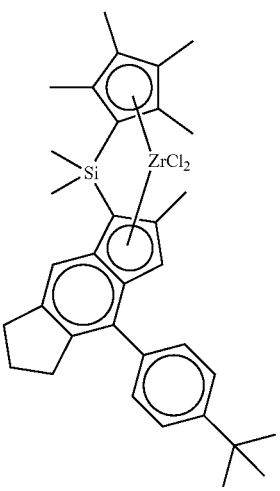

101
-continued
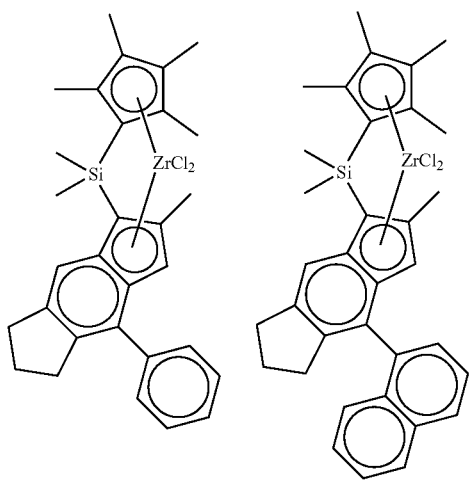
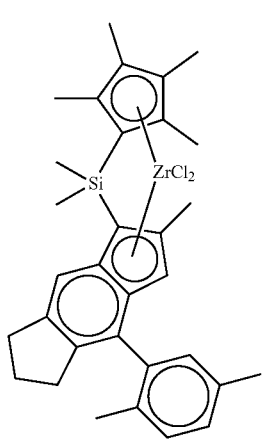
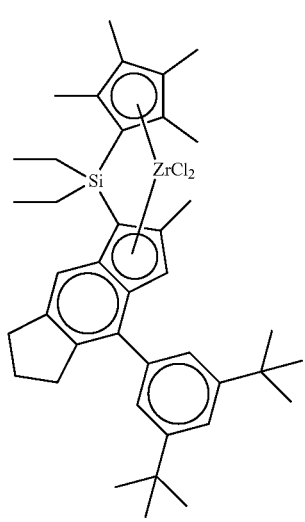
102
-continued
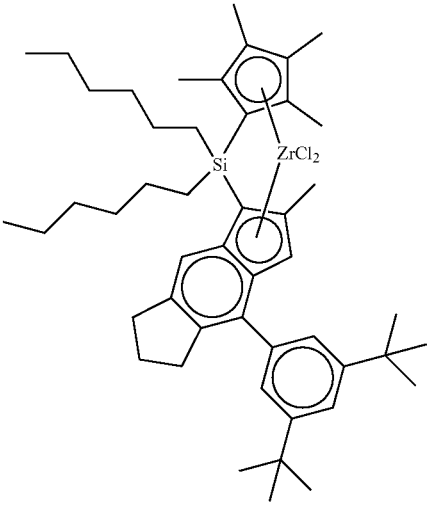
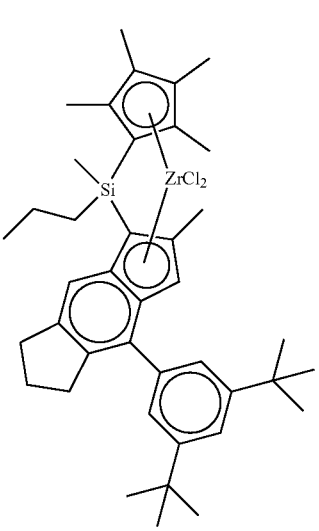
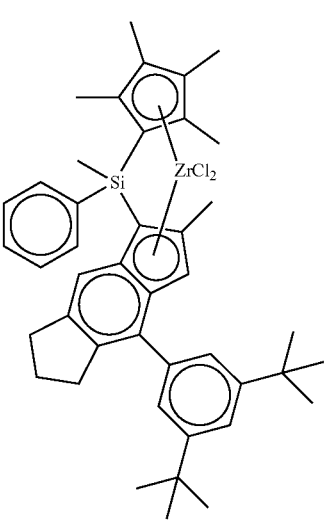

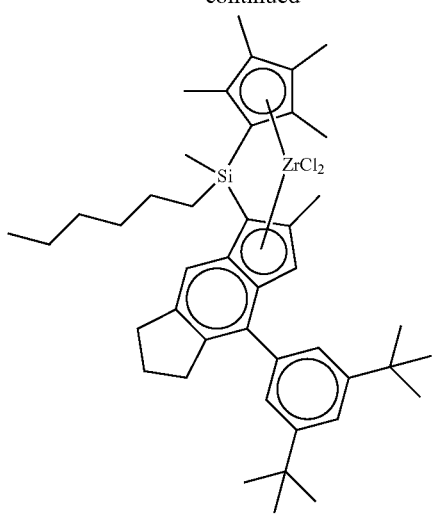
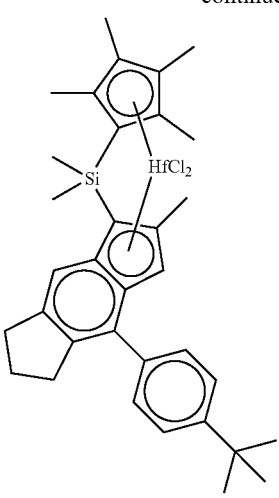
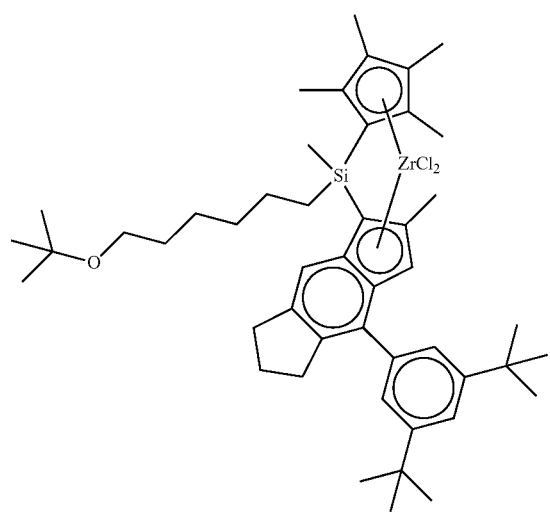
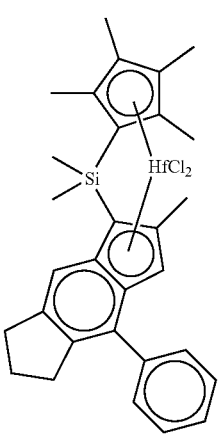
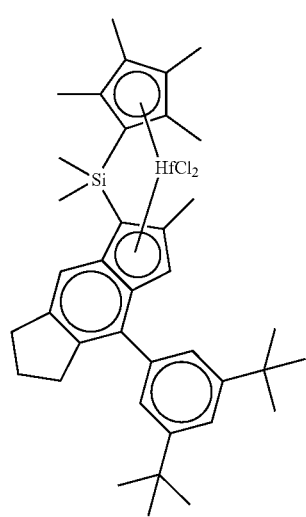
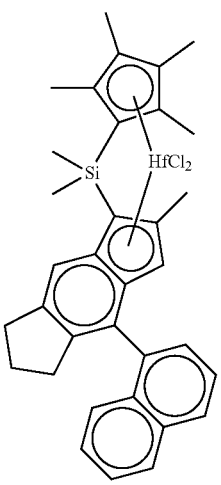

-continued

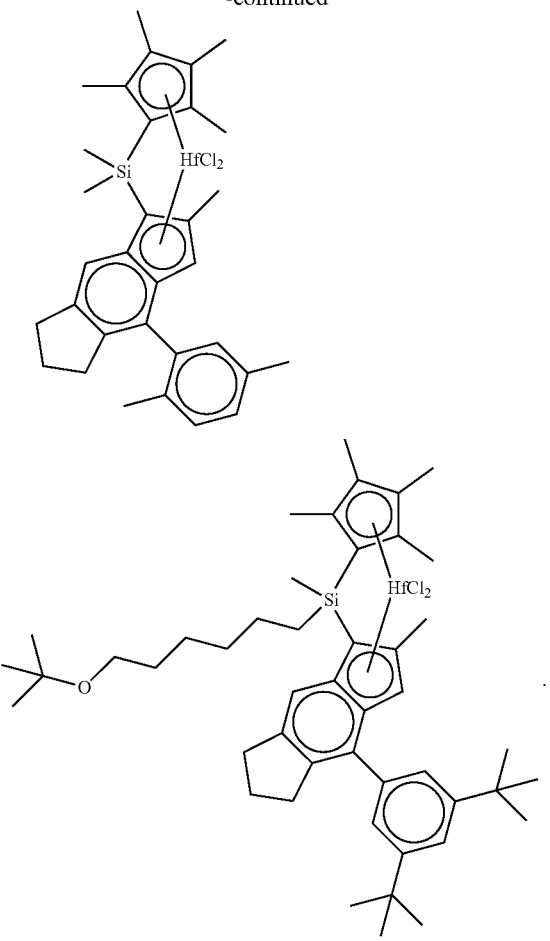

9. A catalyst composition comprising the transition metal compound of claim 1.

10. The catalyst composition of claim 9, comprising the transition metal compound and a support.

11. The catalyst composition of claim 9, further comprising at least one cocatalyst selected from compounds represented by Chemical Formulae 2 to 4:

[Al(R$^{21}$)—O]$_m$—   [Chemical Formula 2]

in Chemical Formula 2,
R$^{21}$ are the same as or different from each other, and are each independently halogen, $C_{1-20}$ alkyl, or $C_{1-20}$ haloalkyl; and
m is an integer of 2 or more;

J(R$^{31}$)$_3$   [Chemical Formula 3]

in Chemical Formula 3,
R$^{31}$ are the same as or different from each other, and are each independently halogen, $C_{1-20}$ alkyl, or $C_{1-20}$ haloalkyl; and J is aluminum or boron;

[E-H]$^+$[ZQ$_4$]$^-$   [Chemical Formula 4]

in Chemical Formula 4,
E is a neutral or cationic Lewis base;
H is a hydrogen atom;
Z is a group 13 element; and
Q are the same as or different from each other, and are each independently $C_{6-20}$ aryl or $C_{1-20}$ alkyl unsubstituted or substituted with at least one substituent selected from the group consisting of halogen, $C_{1-20}$ alkyl, $C_{1-20}$ alkoxy, and $C_{6-20}$ aryloxy.

12. A method for preparing a polypropylene, comprising a step of polymerizing propylene monomers in the presence of the catalyst composition of claim 9.

13. The method for preparing a polypropylene of claim 12, wherein the polymerization step is performed while introducing 750 ppm or less of hydrogen gas based on the propylene monomers.

14. The method for preparing a polypropylene of claim 12, wherein the polypropylene is a homopolymer.

15. The method for preparing a polypropylene of claim 14, wherein the polypropylene has a molecular weight distribution (Mw/Mn) of 2.45 or less, a melt index MI$_{2.16}$, measured at 230° C. under a load of 2.16 kg, of 7.5 g/10 min to 45 g/10 min, and a melting point (Tm) of 152.5° C. or more.

16. The method for preparing a polypropylene of claim 14, wherein the polypropylene has a weight average molecular weight (Mw) of 150000 g/mol or more.

* * * * *